(12) United States Patent
Hennan et al.

(10) Patent No.: US 7,904,456 B2
(45) Date of Patent: Mar. 8, 2011

(54) SECURITY MONITORING TOOL FOR COMPUTER NETWORK

(76) Inventors: Robert John Hennan, League City, TX (US); John G. Roane, Houston, TX (US)

( * ) Notice: Subject to any disclaimer, the term of this patent is extended or adjusted under 35 U.S.C. 154(b) by 1221 days.

(21) Appl. No.: 11/469,775

(22) Filed: Sep. 1, 2006

(65) Prior Publication Data

US 2008/0060071 A1    Mar. 6, 2008

(51) Int. Cl.
G06F 17/00 (2006.01)
G06F 7/00 (2006.01)

(52) U.S. Cl. .......................................... 707/737; 726/22
(58) Field of Classification Search .................. None
See application file for complete search history.

(56) References Cited

U.S. PATENT DOCUMENTS

| 6,308,201 | B1 * | 10/2001 | Pivowar et al. | 709/214 |
|---|---|---|---|---|
| 6,564,197 | B2 * | 5/2003 | Sahami et al. | 706/55 |
| 7,408,458 | B1 * | 8/2008 | Sheleheda et al. | 340/506 |
| 7,673,335 | B1 * | 3/2010 | Chakravarty et al. | 726/11 |
| 2002/0184533 | A1 | 12/2002 | Fox | 713/201 |
| 2004/0039745 | A1 * | 2/2004 | Evans et al. | 707/100 |
| 2004/0172469 | A1 * | 9/2004 | Takahashi et al. | 709/224 |
| 2005/0010555 | A1 * | 1/2005 | Gallivan | 707/2 |
| 2005/0033795 | A1 * | 2/2005 | Wood | 709/200 |
| 2005/0120105 | A1 * | 6/2005 | Popescu et al. | 709/223 |
| 2005/0229255 | A1 * | 10/2005 | Gula et al. | 726/23 |
| 2006/0193538 | A1 * | 8/2006 | Vronay et al. | 382/305 |
| 2006/0280427 | A1 * | 12/2006 | Snowdon et al. | 386/46 |
| 2007/0180107 | A1 * | 8/2007 | Newton et al. | 709/224 |
| 2007/0250699 | A1 * | 10/2007 | Dube et al. | 713/150 |
| 2007/0266139 | A1 * | 11/2007 | Guan et al. | 709/223 |
| 2007/0266369 | A1 * | 11/2007 | Guan et al. | 717/116 |
| 2008/0016569 | A1 * | 1/2008 | Hammer et al. | 726/23 |
| 2008/0284581 | A1 * | 11/2008 | Sheleheda et al. | 340/506 |
| 2009/0222876 | A1 * | 9/2009 | Goldberg et al. | 726/1 |

FOREIGN PATENT DOCUMENTS

WO    WO-2008/028163 A2 *    6/2008

OTHER PUBLICATIONS

Distributed Management Task Force, Inc. "Common Information Model (CIM) Infrastructure Specification", document DSP0004, Version 2.3 Final, Oct. 4, 2005.*

(Continued)

*Primary Examiner* — Luke S Wassum
(74) *Attorney, Agent, or Firm* — Wong, Cabello, Lutsch, Rutherford & Brucculeri LLP

(57) ABSTRACT

A security monitoring tool and method for a computer network receives data and determines whether the data is associated with a host already stored in a database. Based on the determination, the tool stores the data as a new host or associates it with an existing host. The tool also uses the received data to improve how previously stored data is associated with hosts. In one aspect, the tool determines whether the received data indicates that data currently associated with a stored host represents data for at least two hosts. If so, the tool splits the data into two hosts and associates the received data to the appropriate host. In another aspect, the tool determines whether the received data indicates that data currently associated with two or more hosts represent data for only one host. If so, the tool merges the data into one host and associates the received data with that host.

34 Claims, 19 Drawing Sheets

OTHER PUBLICATIONS

MEI Technologies "MEI Payload Integration", downloaded from www.meitechinc.com/Services/ts_disciplines_it.asp, Feb. 13, 2006.*

Guan, J., G. Hays and R. Reiner "Methods, Systems and Computer Program Products for Managing Information Technology (IT) Resources", U.S. Appl. No. 60/799,540, May 11, 2006.*

MEI Technologies "Security Data Warehouse", downloaded from www.meitechinc.com/contract_overviews/sdw.htm, Mar. 9, 2010.*

Transitive law. (2010). In Encyclopædia Britannica. Retrieved Mar. 18, 2010, from Encyclopædia Britannica Online: http://www.search.eb.com/eb/article-9073206.*

* cited by examiner

FIG. 4A

USER SEARCH

ENTER KNOWN SYSTEM INFORMATION BELOW:

| USER ID | |
|---|---|
| LAST | DELA |
| FIRST | |
| EMPLOYER | |
| ORG | |
| E-MAIL | |
| BLDG | |
| ROOM | |
| PHONE | |

[SEARCH]

INFO BOX

| USER ID | |
|---|---|
| NAME | |
| PHONE | |
| BLDG/RM | |
| E-MAIL | |
| ORG/EMP | |

Menu:
- RETURN TO INDEX
- HOST SEARCH
- USER SEARCH
- LOGIN SEARCH
- WEB LOG SEARCH
- FIREWALL RULE SEARCH
- REMEDY CSS SEARCH
- NEW LOCAL HOSTS
- ALL NEW HOSTS
- IDS EVENT
- VULNERABILITY SCANS
- MASS HOST SEARCH
- INCIDENTS
- WIRELESS APs
- REPORTS

SECURITY TOOL - USER SEARCH

| USER ID | LAST | FIRST | EMPLOYER | ORG | E-MAIL | BLDG | ROOM | PHONE |
|---|---|---|---|---|---|---|---|---|
| PDELAYO | DELAYO | PAUL | MSA | LAB | PDELAYO@MSA.COM | 45 | 201 | 123-456-7777 |
| RDELANE | DELANE | RICK | MSA | HR | RDELANE@MSA.COM | HR | 37 | 123-456-7778 |
| CDELAMP | DELAMP | CHRIS | UPDR | EB | CDELAMP@UDPR.COM | 23 | 205 | 123-456-7779 |
| DELARS | DELAR | SARA | MSA | HA | DELARS@MSA.COM | 2 | 101 | 123-456-7770 |

*FIG. 4C*

| INCIDENTS | | | | |
|---|---|---|---|---|
| INCIDENT NAME | EDIT | INCIDENT TYPE | DATE LAST HOST ADDED | REPORTS |
| RDP INVESTIGATION | EDIT | VIRUS | 2006-03-23 08:30:02 | THREAT REPORT |
| P2P | EDIT | VIRUS | 2006-03-22 10:40:01 | THREAT REPORT |
| INSTANT MESSAGING | EDIT | VIRUS | 2006-03-22 08:45:02 | THREAT REPORT |
| MARKETSCORE | EDIT | VIRUS | 2006-03-15 16:10:02 | THREAT REPORT |
| MSRPC 2006-03-02 | EDIT | VIRUS | 2006-03-06 14:05:12 | THREAT REPORT |
| DCOM REMOTEACTIVATE | EDIT | VIRUS | 2006-02-10 11:10:21 | THREAT REPORT |
| NULL BIND ALLOWED | EDIT | VULN | 2006-02-09 11:02:58 | THREAT REPORT |
| FTP ANONYMOUS | EDIT | VULN | 2006-02-09 10:57:59 | THREAT REPORT |

SECURITY TOOL - INCIDENT DETAIL

RETURN TO INDEX
HOST SEARCH
USER SEARCH
LOGIN SEARCH
WEB LOG SEARCH
FIREWALL RULE SEARCH
REMEDY CSS SEARCH
NEW LOCAL HOSTS
ALL NEW HOSTS
IDS EVENT
VULNERABILITY SCANS
MASS HOST SEARCH
INCIDENTS
WIRELESS APs
REPORTS

W32.MYTOB - VIRUS

INCIDENT REPORT (.CSV)   ADD MULTIPLE HOSTS   GET NEXT HOST → 461

ACTIVITY CUTOFF ← 460  [ ▼ ]/[ ▼ ]/[ ▼ ]  ( GO )

INCIDENT HOSTS

| VIEW | HOST | STATUS | ACTION | CONTACT | COMMENTS | LAST MODIFIED BY | LAST ACTIVITY | ADDED BY | DATE ADDED |
|---|---|---|---|---|---|---|---|---|---|
| 🔍 | 140.170.230.130 DT-604591 | COMPLETED | RECONNECTED | DLARS | VERIFIED SYSTEM PATCHED | SPRICE | 2006-05-15 | DLARS | 2005-06-15 |
| 🔍 | 140.170.230.130 (TWOPS-TS4) | COMPLETED | RECONNECTED | | VERIFIED THAT SYSTEM IS PATCHED | ASMITH | 2006-04-15 | ASMITH | 2006-11-17 |
| 🔍 | 140.170.230.130 (KACHER-1) | COMPLETED | RECONNECTED | | SUBSEQUENT SCAN STILL SHOWS VULNERABILITY. | SPRICE | 2006-04-17 | SPRICE | 2005-01-28 |
| 🔍 | 140.170.230.138 (DONSON-A) | COMPLETED | RECONNECTED | ASMITH | REPAIRED UNDER ODIN TICKET | SPRICE | 2006-04-15 | ASMITH | 2006-02-14 |
| 🔍 | 140.170.230.134 822.PF | FALSE POSITIVE | RECONNECTED | | FALSE INDICATION | DLARS | 2006-04-25 | SPRICE | 2004-03-15 |
| 🔍 | 136.170.230.120 (BERG-L) | COMPLETED | REPAIRED | DLARS | COULDN'T BE DISCONNECTED, REMOVED FROM NETWORK | SPRICE | 2006-04-13 | ASMITH | 2003-07-12 |

SECURITY MONITORING TOOL FOR COMPUTER NETWORK

FIELD OF THE DISCLOSURE

The subject matter of the present disclosure relates to a security monitoring tool for collecting and analyzing security related data of a computer network.

BACKGROUND OF THE DISCLOSURE

Computer systems have experienced increased network traffic and evolving threats. In addition, more dynamic devices including wireless devices such as laptops and handhelds, multi-boot computers, virtual machines, etc., are connecting to the networks of computer systems. Due to these and other issues, the quantity and complexity of data required to monitor networked computer systems have rapidly increased. Much of that data is collected from disparate sources that typically have limited commonality between them. Consequently, large volumes of data must be processed and analyzed from multiple sources to monitor the security related issues of a computer system. Frequently, security analysts may encounter a number security issues that require a quick response. However, the security analysts are typically able to use only a small subset of the available data to handle the security issues.

Tools, such as PATCHLINK™ and SOLARWINDS™, can be used to collect information about computer systems. Other tools, such as NetContExt and CiscoWorks, can be used to monitor computer systems. Some prior art systems for monitoring the security of computer systems are known as "security information management" (SIM) or "security event management" (SEM) systems. These prior art systems can process log data in real time against an intelligent rule set or a subsystem that looks for anomalies. Typically, these types of prior art systems require security analysts to perform a number of manual and time consuming tasks to locate and correlate the data. One drawback of these systems is that they are not effective at mapping events to individual devices; in particular, their usefulness is limited to large dynamic environments. Consequently, the security analysts are not readily able to evaluate the information to determine patterns and meaning from the data.

Components of a computer network can be identified using a variety of means. For example, an Internet Protocol (IP) address is an identifier for a computer or other device on a network that uses the TCP/IP protocol. A Media Access Control (MAC) address is a hardware address that uniquely identifies each node of a network. Domain Name System (or Service or Server) (DNS). The DNS is used to translate domain names into IP addresses. Network Basic Input Output System (NetBIOS) defines capabilities of components (e.g., computers) of a network.

The subject matter of the present disclosure is directed to overcoming, or at least reducing the effects of, one or more of the problems set forth above.

SUMMARY OF THE DISCLOSURE

A security tool and method are disclosed for a computer network. A database stores information for a plurality of network devices or hosts. The hosts may include desktop computers, servers, laptops, routers, switches, storage systems, or other elements of the computer network being monitored for security purposes. Computer programs called "loaders" obtain security related data from data sources associated with the computer network. The data sources may include security application log files, system logs, databases, and network scanner results. These data sources obtain network connection data, login data, events, incidents, activities, and other network related information associated with the computer network that can be used for security purposes and analysis.

The security tool receives the data from the loaders and heuristically determines how to correlate and organize the received data in the tool's database. For example, the security tool determines whether the received data corresponds to information about hosts already stored in the database by determining if at least one host identifier of the received data is associated with at least one of the stored hosts in the database. If there is no such association, the security tool associates the received data with a new host in the database as long as the received data includes enough information to create a new object or entry corresponding to the host.

If, on the other hand, the incoming data is associated with at least one of the hosts already stored in the database, the security tool assigns the received data the same unique key used to identify the stored host. In this way, the security tool can store the received data in appropriate records and tables of its database and associate the received data with the proper host using the same unique key.

The security tool can use the newly received data to improve how the previously stored data has been associated with hosts in the database. Data sources often contain incomplete or ambiguous information that makes it difficult to classify the data in a single pass. These conditions can create situations where a previous operation of the security tool may have resulted in received data being erroneously associated with one host when it actually belonged to another host or an entirely new host. In another example, previously received data may have been erroneously associated with a new host when it actually belonged to an existing host in the database of the security tool.

To improve how data is associated with hosts, the security tool determines whether the received data indicates that stored data currently associated with at least one of the stored hosts represents data for at least two hosts of the computer network. In addition, the security tool determines whether the received data indicates that stored data currently associated with at least two of the stored hosts represents data for only one host of the computer network. Based on these determinations, the security tool associates the received data with one or more hosts of the computer network. In other words, the security tool is continually able to correct errors in the database as new, more precise, data is made available.

With the data for the host stored in the database, a security analyst can use a Graphical User Interface (GUI) of the security tool to access and analyze the data. For example, the GUI can include screens for searching for hosts and users and for managing and reporting incidents and events associated with the hosts.

The foregoing summary is not intended to summarize each potential embodiment or every aspect of the present disclosure.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIGS. 4A-4I illustrate various embodiments of user interface screens for the security tool of FIG. 3.

Figure 1:
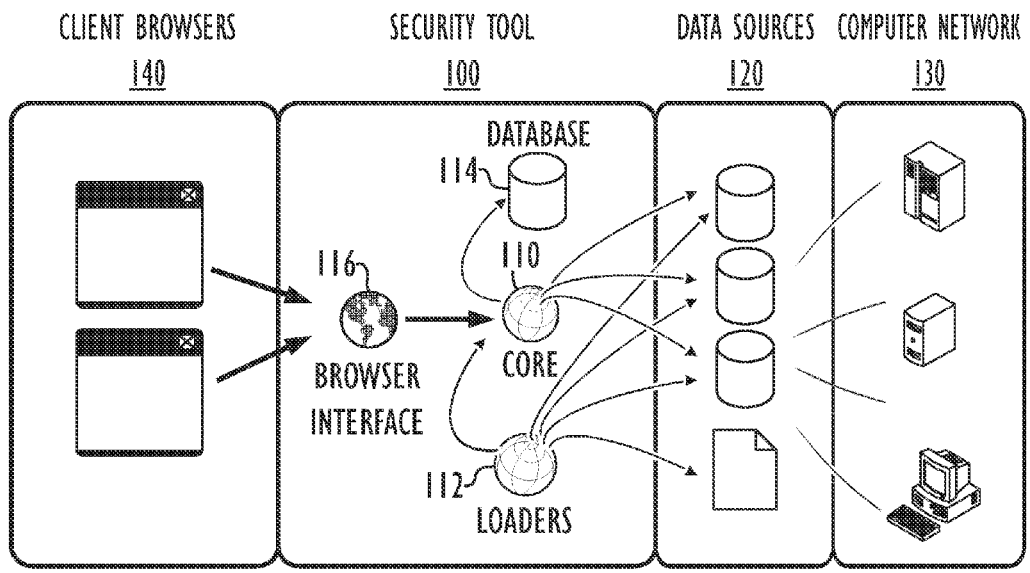
FIG. 1 illustrates one embodiment of a security tool according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, one embodiment of a security tool 100 according to certain teachings of the present disclosure is schematically illustrated. The security tool 100 is an analytical and reporting tool for Information Technology (IT) security of a computer system or network 130. The security tool 100 includes a core 110, loaders 112, and a database 114. The security tool 100 also includes a browser interface 116 for client browsers 140 to access the security tool 100.

Security resources or data sources 120 communicate with or are part of the computer network 130 and store security related data and other information pertaining to "hosts" of the computer network 130. The data sources 120 can store security data from disparate information systems. The loaders 112 of the security tool 100 obtain data from the data sources 120 and submit the data to the core 110. In turn, the core 110 correlates and organizes the disparate data from the various data sources 120 and stores the data in the database 114 of the security tool 100. For example, the data in the data sources 120 pertain to the numerous "hosts" of the computer network 130, and the core 110 uses host-matching algorithms (discussed in more detail below) to normalize the data into a common data model that is stored in the database 114 of the tool 100. The browser interface 116 of the tool 100 provides a convenient mechanism to make the data in the database 114 available to system analysts using the client browsers 140 communicating with the tool 100.

Figure 2:
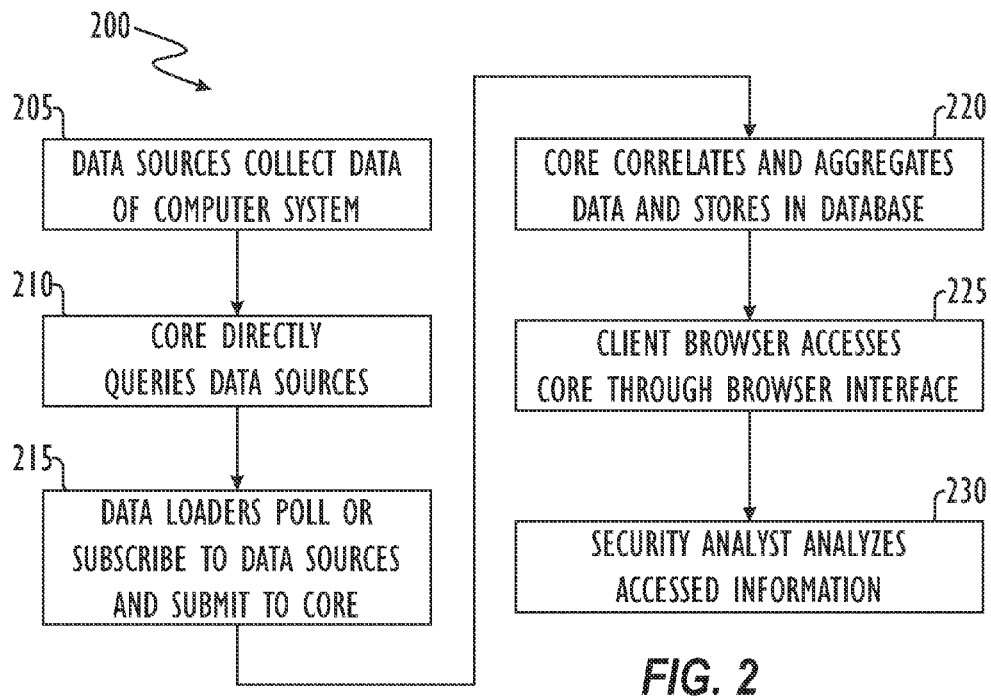
FIG. 2 illustrates one embodiment of an operating process of the security tool of FIG. 1.

An embodiment of an operating process 200 of the security tool 100 of FIG. 1 is illustrated in flow chart form in FIG. 2. (To help describe the operating process 200, reference numerals for the elements of FIG. 1 are used in the discussion that follows). During operation, the data sources 120 collect or receive data about the computer network 130 (Block 205). The core 110 then receives the data from the data sources 120. In one embodiment, the core 110 directly queries the data sources 120 for data (Block 210). In another embodiment, loaders 112 poll or subscribe to the data sources 120 and submit the data to the core 110 (Block 215). The core 110 then correlates and aggregates the received data and stores it in the database 114 (Block 220). To correlate and aggregate the received data, for example, the core 110 maps the data from the various data sources 120 to individual hosts of the computer network 130. Then, the core 110 stores the data in the database 114 based on the mapping of the hosts to organizing it.

Security analysts of the computer network 130 can then access the core 110 using client browsers 140 and the browser interface 116 of the tool 100 (Block 225). Finally, the security analyst analyzes the accessed security data of the tool 100 to achieve any of a number of objectives (Block 230). For example, the security data of the tool 100 can increase situational awareness, can support incident response, can reduce vulnerability of the computer network 130, and can be used for forensics investigations of the computer network 130. Security analysts can track changes in the configuration of the computer network 130 back to the host where the change originated, for example. In addition, the security analysts can monitor user related activities because the security tool 100 can log and track the user related activities across multiple components and network access points of the computer network 130.

Figure 3:
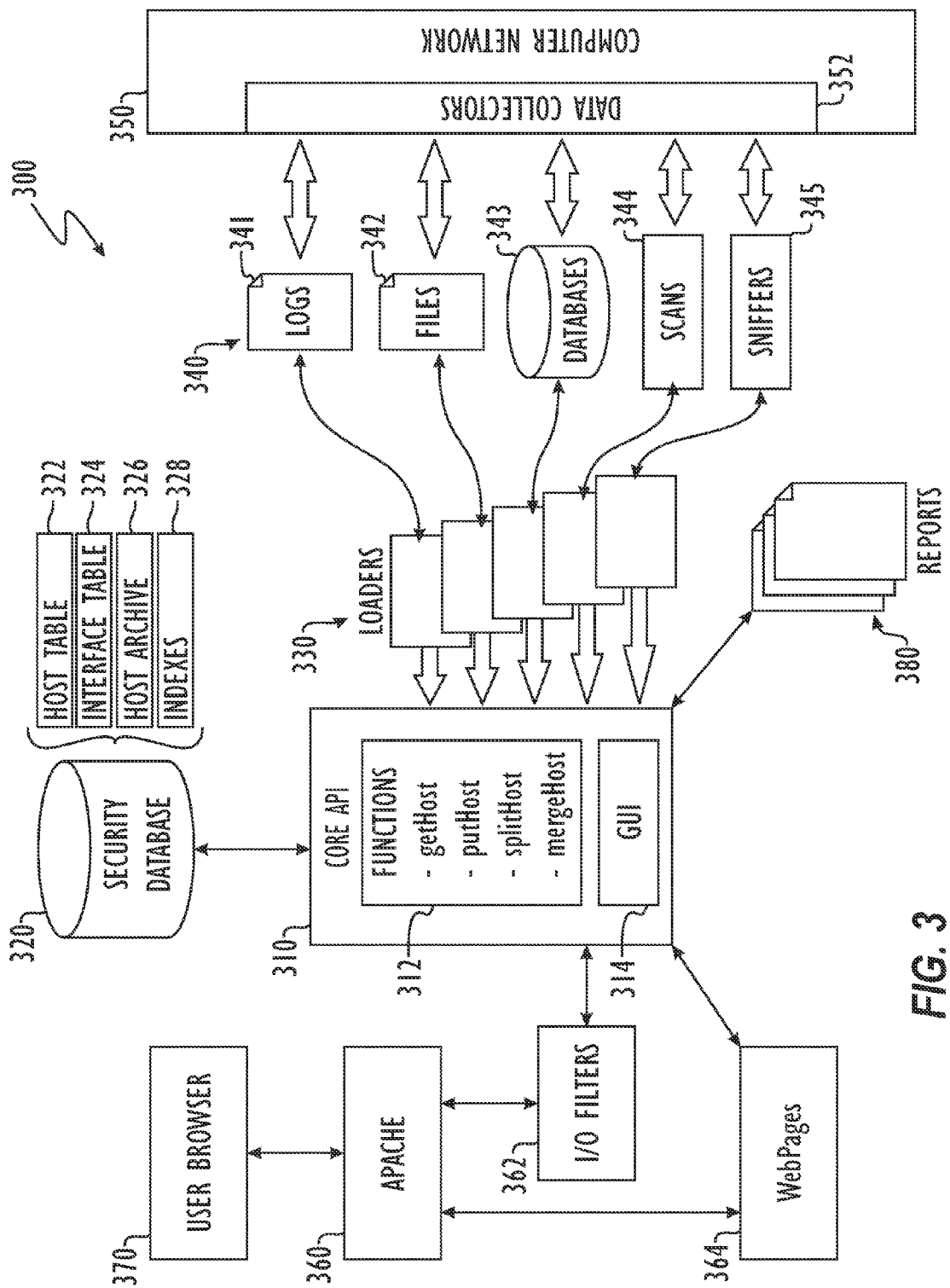
FIG. 3 illustrates another embodiment of a security tool according to certain teachings of the present disclosure.

Referring to FIG. 3, another embodiment of a security tool 300 according to certain teachings of the present disclosure is schematically illustrated. The security tool 300 includes a core program 310, a security database 320, a plurality of loaders 330, an Apache or other web server 360, input/output (I/O) filters 362, and WebPages 364 having Hyper Text Markup Language (HTML) scripts. The security tool 300 is used to monitor security related data of a computer system or network 350 having a plurality of data sources 340. In one embodiment, elements of the security tool 300, such as the core program 310 and loaders 330, are written primarily in Perl™ and are configured to run on an Apache/mySQL/Linux stack. (PERL is a trademark of the Yet Another Society DBA The Perl Foundation, a non-profit corporation. LINUX is a registered trademark of Linus Torvalds, an individual). Other embodiments of the security tool 300 can run on Mac OS® X and can be ported to run on Microsoft Windows® servers running Perl support binaries as well. (MAC OS is a registered trademark of Apple Computer, Inc. WINDOWS is a registered trademark of the Microsoft Corporation.)

The core program 310 has a Graphical User Interface (GUI) 314 that allows security analysts to interface with the security tool 300 using user browsers 370, Apache Server 360, I/O filters 362, and WebPages 364, for example. Details related to the GUI 314 are discussed below with reference to FIGS. 4A-4I. The core program 310 provides a plurality of functions 312, including getHost, putHost, splitHost, and mergeHost, each of which is discussed in detail with reference to FIGS. 5 through 9. The functions 312 are used to correlate and organize security data from the data sources 340 of the computer network 350.

Each loader 330 is associated with one of a plurality of data sources 340. The loaders 330 are preferably Perl scripts that can be independently added and removed from the security tool 300 depending of the number and type of data sources 340 associated with the monitored computer network 350.

In general, the data sources 340 can include any source of information regarding the computer network 350 and associated network relevant to security purposes. For example, the data sources 340 can include logs 341 from servers of the computer network 350 and can be based on Dynamic Host Configuration Protocol (DHCP), dial-in, wireless, Virtual Private Network (VPN), domain controllers, and proxies. The logs 341 can also include Domain Controller logs, Active Directory logs, and Firewall logs.

In another example, the data sources 340 can include files 342 that contain relevant network topology data from router and switch configurations. The data sources 340 can also include databases 343, such as Syslog databases, intrusion detection system databases, configuration management databases, Web Registration Databases, and patch management databases. The data sources 340 can also include computer system scans 344, such as Nmap, NetBIOS name table scan (NBTscan), and Internet security system vulnerability scans. Furthermore, the data sources 340 can include other sources 345 such as "sniffers" or external applications. For example, the "sniffers" can be passive operating system fingerprinting mechanisms (e.g., "p0f script") on the network of the computer network 350 that monitor the information sent by hosts while communicating on the network. The external applications of the other sources 345 can be other security systems, modules, and applications. One example of such an external application is SiteProtector™ from Internet Security Systems, Inc.

The various data sources 340 can obtain, retrieve, or receive data of the computer network 350 and associated network. For example, certain processes of the computer network 350 may generate data for some of the data sources 340. In addition, data collectors, agents, and other mechanisms 352 known in the art may gather data of the computer network 350 and store the data in one or more of the data sources 340. In turn, each of the loaders 330 poll or subscribe to its (one or more) associated data source 340 to obtain data. The loaders 330 can generally have read-only permission to the data sources 340.

The loaders 330 can obtain data from the data sources 340 periodically according to a schedule or they may be prompted by a user. The data obtained by the loaders 330 may be recent in time or may be older depending on which data source 340 the data comes from and when the data source 340 acquired the data. It will be appreciated that most forms of data in the data sources 340 have timestamps or other date related information.

The data in the data sources 340 includes events, incidents, logins, machine interfaces, and a variety of other information relevant to the computer network 350 and its network environment. In general, an incident refers to an activity or occurrence that threatens the computer network 350 or makes it vulnerable. Incidents can include, but are not limited to, Remote Desktop Protocol investigations, Peer-to-peer violations, instant messaging violations, virus detection, remote procedure call (RPC) violations, Distributed Component Object Model (DCOM) remote activation attempts, and an anonymous File Transfer Protocols (FTP). Events refer to situations when an incident occurs either due to a host, outside cause, or internal cause. In general, the data pertains to "hosts" of the computer network 350 and pertains to events and activities of those "hosts." As used herein, a "host" is any device or component connecting to the network of the computer network 350. For example, a host can include a workstation, a network computer, a server, a laptop, a Wireless Application Protocol (WAP) enabled device, a handheld, a router, etc. In addition, a "host" as used herein can be any user using the computer network 350. The hosts may be already known to the security tool 300 or may be entirely new.

The core program 310 receives the data from the loaders 330 obtained from the data sources 350. Using its various functions 312, the core program 310 analyzes and indexes relevant security data that has been obtained by the loaders 330 and that has already been stored in the security database 320. The security database 320 does not need to store all event information. Typically, the security tool 300 collects what it needs to facilitate speedy correlation of hosts related information and interface information of the hosts with the computer network 350 across the disparate data sources 340 that retain the data. Thus, the database 320 of the security tool 300 can be relatively smaller than those used in the common SIM/SEM class of systems.

The database 320 has a host table 322 and an interface table 324. In addition, the database 320 can have a host archive 326 and search indexes 328. The host table 322 stores information used to identify hosts for the computer network 350. For example, the host table 322 stores host records that include a HostKey, a NetBIOS name, a NetBIOS domain, date last seen on the network, a date updated, a date collected, and various identifying information. Illustrative identifying information includes, but is not limited to, the location, operating system, serial number, and asset tag, for the hosts. In one embodiment, the HostKey is a unique identifier assigned to each host by the security tool 300 and is different and unique from the MAC address, IP address, NetBIOS name, DNS name, or other identifier for the components and users of the computer network 350. In this way, the security tool 300 can assign an independent identifier to hosts that is separate and apart from any of the common identifiers used in the computer network 350.

The host archive 326 is used to archive information for hosts. For example, names of host are often changed in the computer network 350. When this happens, it may be beneficial to archive records for that host separate from any of the more current host information, although this is not strictly necessary.

The interface table 324 stores information on interfaces made by the hosts when connecting to the computer network 350. For example, the interface table 324 stores a date/time for when a host interfaced with the computer network 350 and stores one or more of an IP address, a MAC address, a DNS name, a domain, a NetBIOS name, a switch, a switch port, a jack number, and information of a Network Interface Card used for that interface. Interface records in the table 324, therefore, represent logins and other activities of the associated host.

In addition, the interface records in the table 324 include the HostKey for the host with which the record is associated. As noted previously, the HostKey is the unique identifier assigned to each determined host of the computer network 350. Because the HostKey is a separate form of identification for components of the computer network 350 and is different from any IP address, MAC address, DNS name, domain, NetBIOS name, etc., the HostKey for a given interface record in the table 324 is determined based on the data received from the loaders 330. The reliability with which the HostKey is determined and associated with an interface record in the table 324 depends in part on how much data has been provided from the loaders 330, which in turn depends on how much data is in the data sources 340. For example, a given interface record of the table 324 is created from data received from a loader 330, and a HostKey is associated with the interface record in the table 324. It may be possible that the interface record in the table 324 actually belongs to a different host than the one assigned to the HostKey associated with that record. In addition, it may be possible that the unique HostKey associated with the interface record does not belong to one independent host and actually should be associated with two hosts. As will be discussed in more detail below, the functions 312 of the security tool 300 are used to handle these various eventualities.

As the names of the functions 312 indicate, the core program 310 uses the functions 312 to correlate, aggregate, and divide the data obtained from the loaders 330 and the data sources 340 in a way that maps that data to individual hosts of the computer network 350. For example, the "getHost" function 312 gets information for the hosts stored in the security database 320. The "putHost" function 312 puts new host information into the security database 320. The "splitHost" function splits the information assigned to one host in the security database 320 into two or more hosts. The "mergeHost" function 312 merges information assigned to two or more hosts in the security database 320 into one host. Further details related to the functions 312 are discussed below with reference to FIGS. 5 through 9.

In mapping the information to hosts, the functions 312 can time-sequence events and correlate activities to the hosts. As will be appreciated, the types of events and activities associated with the hosts of the computer network 350 may vary depending on security objectives. The core program 310 can also including a reporting function to produce various reports 380 of the information.

In addition to obtaining and analyzing host related information, the core program 310 allows users and applications to interface with the information. For example, security analysts can use a user browser 370 to access the core program 310 using a Web interface that includes the graphical user interface 314, an Apache or other web server 360, I/O filters 362, and WebPages 364. Further details related to the GUI 314 are discussed below with reference to FIGS. 4A through 4H.

As evidenced herein, the security tool 300 can be used to reconcile security data from disparate data sources 340 of the computer network 350. The security tool 300 supports a number of security related activities for analysts to monitor the computer network 350. Fundamentally, the security tool 300 can be used to aggregate, correlate, and report information in archived security logs and other data sources 340 of the computer network 350. Some of the security related activities available to analysts using the security tool 300 include incident response, vulnerability reduction, forensics analysis, management decision making, and reporting. Examples of some of the typically users of the security tool 300 can includes security analysts, IT security officers, system administrators, Chief Information Officers, and others.

To help analysts respond to incidents occurring in the computer network 350, the security tool 300 can be used to correlate alerts to machines, users, administrators, locations, related logs, operating systems, patches, security plans, etc. To help analysts reduce the vulnerability of the computer network 350, the security tool 300 can be used to correlate scanned information to machines, locations, risk acceptance tables, histories, security plans, etc. To help analysts perform forensic investigations of the computer network 350, the security tool 300 can be used to associate virus alerts (or users) to computers, sessions, firewalls, and URL logs. The security tool 300 can also be used to correlate infections to their source (e.g., URL or IP) and can be used to blacklist users and sources.

To help analysts manage the computer network 350, the security tool 300 can be used to identify trends and to develop security policies for the computer network 350. To help analysts report information on the computer network 350, the security tool 300 can support data calls and can generate ad-hoc reports 380 on system registration, firewall registration, Organization Computer Security Manager (OCSM) portals, and other security plans. These and other benefits of the security tool 300 will be apparent to one skilled in the art having the benefit of the present disclosure.

The security tool 300 can gather some information of the computer network 350 in real time. However, one function of the security tool 300 is to provide on-demand aggregation, reconciliation, and reporting of disparate information in a number of meaningful data views for the security analysts. Using the GUI 314 and other user interface components, security analysts can drive the security tool 300 by querying the stored security related information against a variety of types of security data and/or timeframes. The query results from the security tool 300 facilitate further drill down into related details of the results that can span all applicable data sources 340 of the computer network 350.

Before going into further details of the core program 310 and its various functions 312 and other features, it will be helpful to discuss the graphical user interface 314 of the security tool 300 to show examples of how a security analyst may use the security tool 300 in a particular implementation. Therefore, we now turn to FIGS. 4A through 4H to discuss embodiments of screens of the GUI 314 for the security tool 300.

Figure 4A:
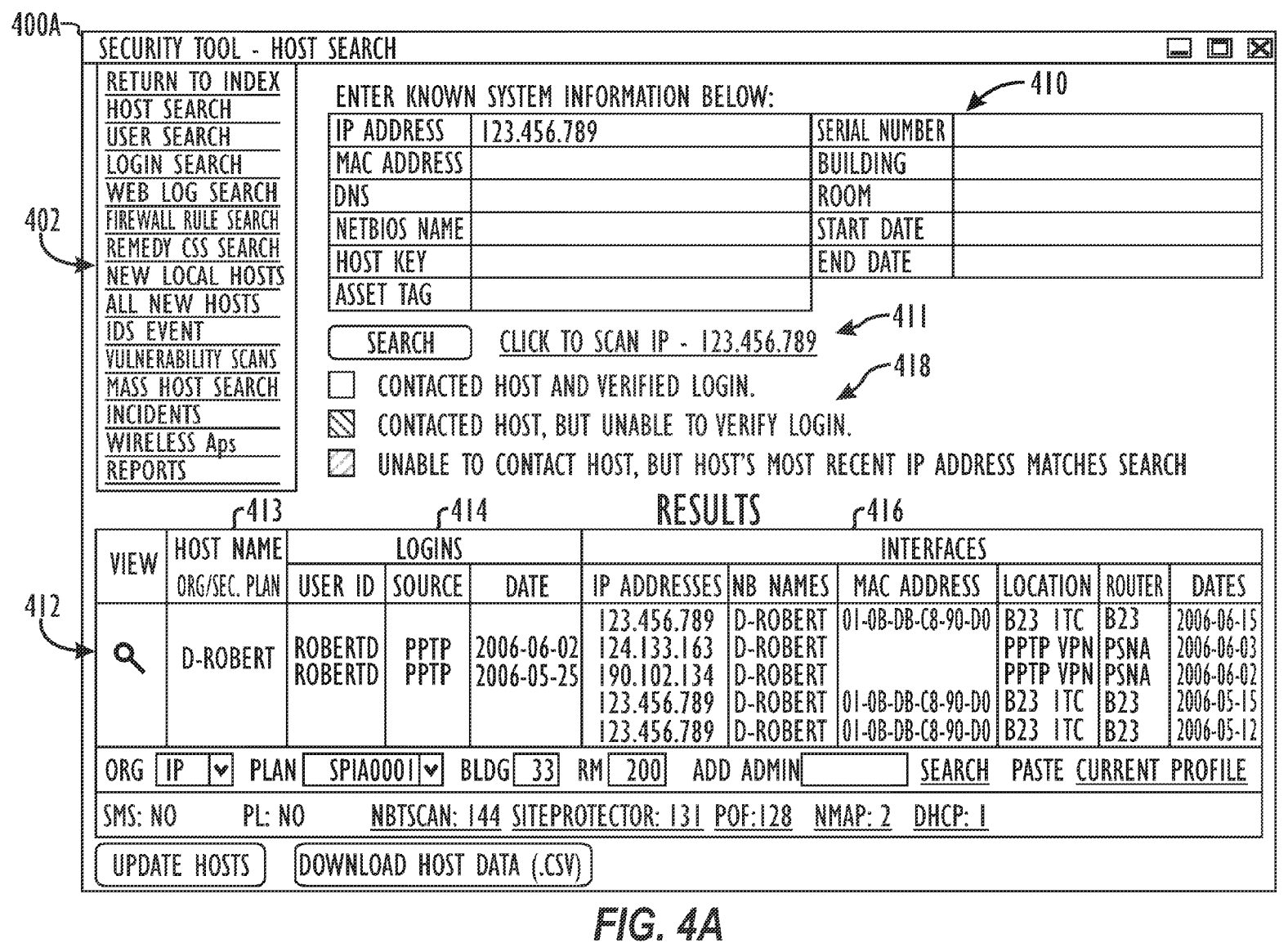

In FIG. 4A, a first screen 400A of the GUI for the security tool of FIG. 3 is illustrated. In general, the user interface screens of the security tool, such as this screen 400A, provide a number of tools 402 for the security analysts to access. For example, these tools 402 can be used to search for hosts, users, logins, web logs, firewall rules, new hosts, all new hosts, and mass hosts. The "New Local Hosts" search can be used to search for new hosts within a defined boundary of the computer network, while the "All New Hosts" can be used to find those hosts both inside and outside of the defined boundary of the computer network. In other words, "New Local Hosts" displays information about managed hosts that have first appeared within the past 72 hours. "All New Hosts" shows a similar result as "New Hosts," but "All New Hosts" also includes information about unmanaged hosts, i.e., information for hosts within the database that are defined as not being included within a parent organization's IT inventory. "Mass Hosts" is a tool for querying the database to search for several systems at one time and allows the user to enter a list of attributes for multiple hosts at once, whereby the tool will return results for all related hosts. For example, a security analyst can manually submit a list of IP addresses to search, and the "Mass Hosts" tool attempts to return the best, single host for each of those input IP addresses. In addition, these tools 402 can be used to analyze intrusion detection system (IDS) events, vulnerability scans, incidents, and reports, each of which will be discussed in more detail later.

This screen 400A is used to search for hosts of the monitored computer system and allow the security analyst to understand recent changes to the configuration or network location of hosts. To conduct a search, the screen 400A includes search fields 410 that allow the security analyst to enter known host information, such as IP address, MAC address, DNS name, NetBIOS Name, HostKey, Asset Tag, serial number, location, etc. In the present example, the analyst has entered only an IP address to search for a host. A link 411 is provided to initiate a current scan of the entered IP address. During the search, the security tool finds all hosts that match the input criteria and then returns search results 412. In FIG. 4A, only one host 413 is shown in the search results 412, but additional hosts may be listed depending on the search criteria and the stored information. For each listed host 413, the search results 412 display recent logins 414 and interface data 416. Preferably, the search result 412 for each listed host 413 provides a clustered set of interfaces between the listed host 413 and the computer network. For example, only the five most recent logins (e.g., interfaces) are shown in the results 412 in FIG. 4A for the one listed host 413. The information for logins 414 include the user ID, login source (VPN, standard domain login, NBTscan, Point-to-Point Tunnelling Protocol (PPTP), etc.), and the date of that login. The interface information 416 for each of the logins 414 includes the IP address, NetBIOS Name, MAC address, location, router, and date information for the login 414. In addition, the search results 412 for each listed host 413 are color coded according to a color scheme 418 to highlight which of the listed hosts 413 in the results 412 represent a contacted host and verified login, a contacted host but unverified login, and uncontacted host but with matching search criteria.

Multiple records can be returned for a given set of search criteria. For example, if the security analyst searches for "JS" as the NetBIOS Name, the security tool can return all hosts having NetBIOS Names containing "JS" for example. The results 416 can also list NetBIOS Names found in the search that do not currently contain the specified "JS" if the given host was previously in use with a name that matches that "JS," but its most recent configuration has a name listed as something else.

Figure 4B:
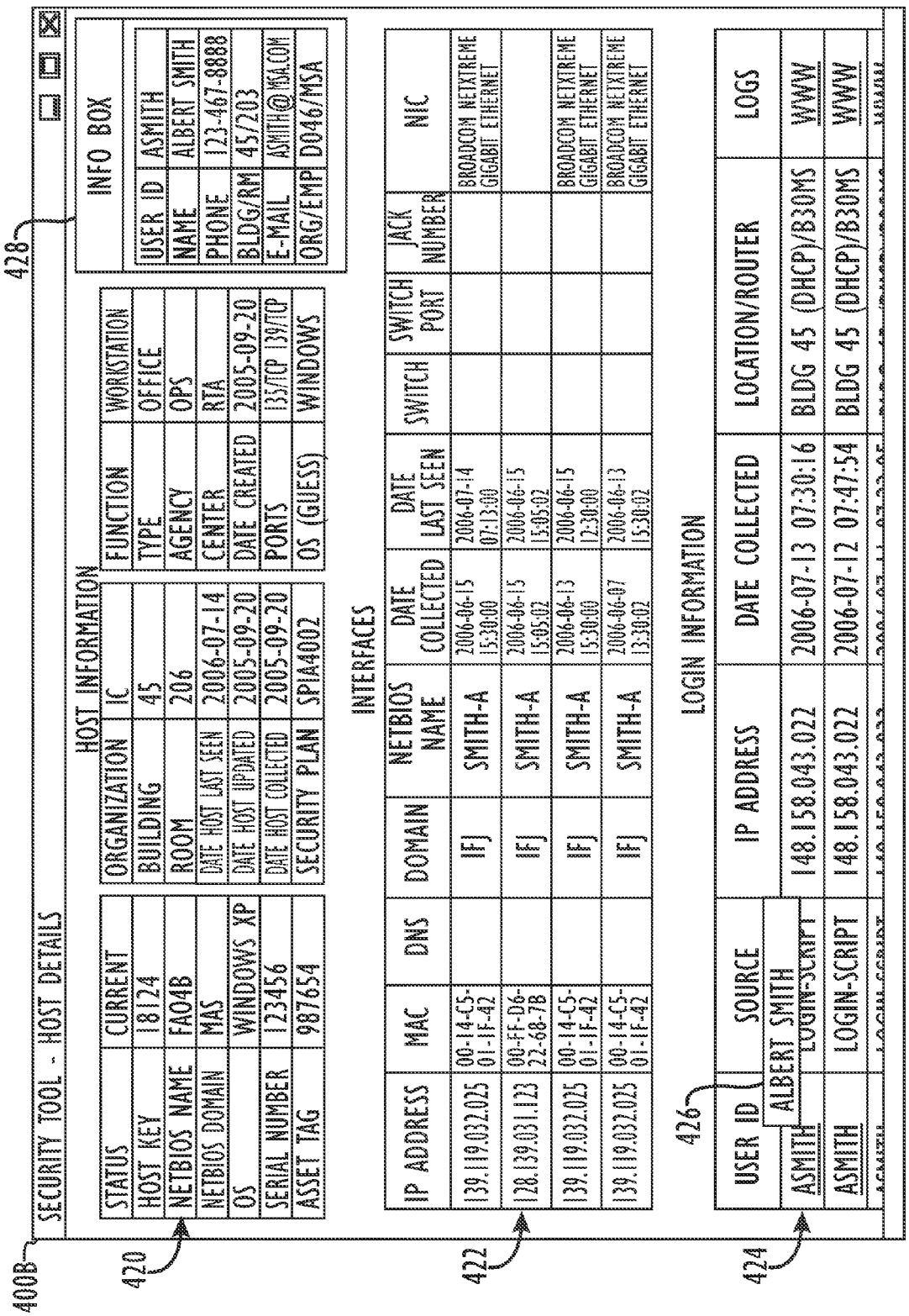

If the security analyst decides to view more than the five given logins 414 and interfaces 416 about the host in question, the security analyst can select the magnifying glass icon next to the host 413 in the search results 412 to access a more detailed host screen. For example, a host detail screen 400B of FIG. 4B shows host details that can accessed from a search. The host detail screen 400B shows the host information table 420, an interfaces table 422, and a login table 424 of a selected host. The host information table 420 includes the HostKey, NetBIOS name, NetBIOS domain, Serial Number, Asset Tag, Building, Room, operating system information, and a large amount of other meta-data about the host. Additional links (not shown) can also be provided that allow the security analyst to request data from remote systems for the specific host being viewed. For example, a link to all web logs, a link to Patchlink™ Data, a link to IDS events, and other links can be included.

The interfaces table 422 shows known interfaces that the host or system has made onto the network of the monitored computer system. The information in the interfaces table 422 is obtained from the data sources 340 (e.g., log files, Syslog database, sniffers, external application) by the loaders 330. The illustrative interfaces table 422 include the IP address, MAC address, DNS name, the Domain, and NetBIOS name that the given system had during the timeframe that the interface was active. In addition, the interfaces table 422 includes the switch, the switch-port, the physical network jack, and the name of the network interface card used in the interface. Some of this information in table 422 may not have been available at the time the host interfaced with the network and is, therefore, not included in the table 422. However, the security tool of the present disclosure has been able to associate the host interface(s) using the techniques disclosed herein even when certain information about the host is different or missing.

The host detail screen 400B also includes the login table 424 that shows known logins for the host in question. The login table 424 describes the User ID, the source, the IP address where the login occurred, and the date and time of the login, as well as the location of the network on which the login occurred. Links are also provided to web logs for the login sessions described in the table 424.

An additional feature of the security tool GUI shown in screen 400B is a contextual "Info Box" 428 that can be used to show additional information about whatever piece of data a cursor is "hovered" over on the screen 400B. In this example, the cursor was placed over User ID "ASMITH" 426, and the info box 428 displays pertinent contact information about that user ID 426. Use of the "Info Box" 428 can take a step out of the analysis process by allowing the security analyst to examine details of the search results quickly from this one screen 400B.

In FIG. 4C, another search screen 400C of the illustrative security tool GUI is shown. This screen 400C allows the security analyst to search for users. The user search screen 400C includes search fields 430. After the security analyst enters desired criteria in fields 430 and selects "Search," the screen 400C presents a list 432 of users for whom data has been collected that match the search criteria. The list 432 shows information on the found users, such as the User ID, last name, first name, position (e.g., employer or organization), e-mail, location (e.g., building and room), and contact number. From this list 432, the security analyst can select a given user to see more detail.

Figure 4D:
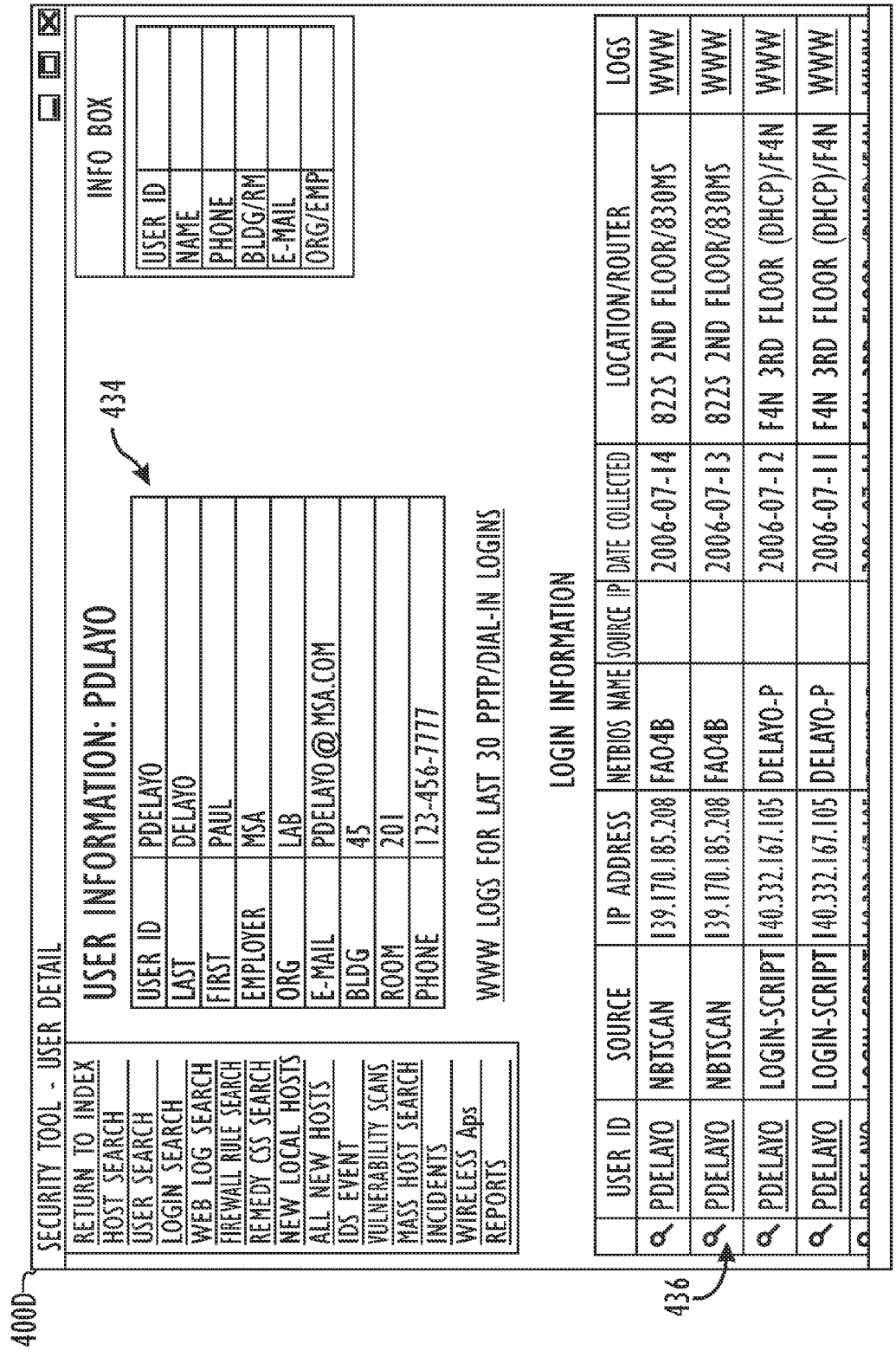

In FIG. 4D, for example, a detail user screen 400D is shown. This screen 400D lists basic information in a "User Information" table 434 and shows a "Login Information" table 436 showing the logins for the given user. The login information in the table 436 allows the security analyst to track down various hosts or systems that the user has used to access the network of the monitored computer system. For example, the login information in the table 436 shows the source (e.g., NBTscan, login-script, etc.) of the login information and shows the IP address, the NetBIOS name, the source IP, the date collected, and the location/router of the login. Links (e.g., WWW) are also provided to web logs for the login sessions described in the table 436.

In addition to searching for hosts and users and viewing detailed information for them, security analysts can view and correlate incidents of the monitored computer system. In FIG. 4E, an incidents screen 400E of the GUI is shown after the security analyst has selected "Incidents" 404 in the tools 402. A list 440 of incidents being tracked within the monitored computer system are shown on the screen 400D. The incidents in the list 440 may be created manually by the security analysts or automatically generated by the security tool of the present disclosure. As defined previously, an incident refers to activities or occurrences that threaten the computer network 350 or make it vulnerable. Some examples of incidents include detected viruses, spyware, network rule violations, login violations, improper user activity, etc. For example, improper user activity may include using instant messaging, using a Peer-to-Peer connection, or accessing a restricted Web Site from a host of the network computer system. A link 442 allows the security analysts to add a new incident to the list 440, although embodiments of the security tool of the present disclosure can automatically generate incidents to be monitored and add them to the list 440. In addition, links 444 are provided to edit the incidents in the list 440, and links 446 are given to access threat reports for the listed incidents.

Figure 4F:
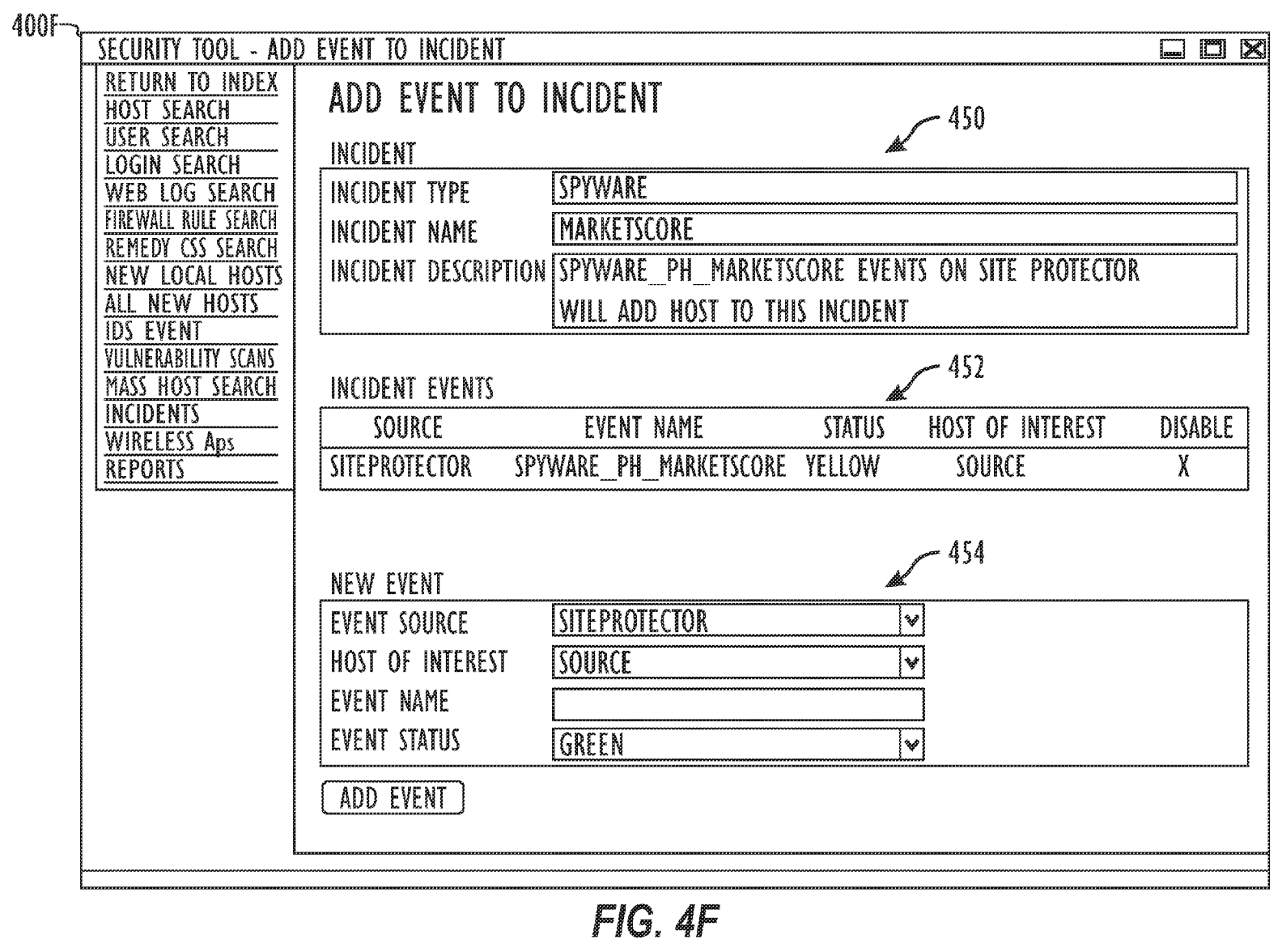

In addition to adding and viewing incidents, the GUI of the security tool allows security analysts to add events to incidents being monitored for the computer system. In FIG. 4F, a screen 400F is shown where a security analyst can add events to a an incident. This screen 400F can be accessed by the edit link 444 for an incident in the list 440 of FIG. 4E. To add an event to an incident with screen 400F, the analysts can configure the security tool to add an event automatically to an incident when the event is detected. Information on a selected incident is listed in fields 450. For example, the incident in the fields 450 refers to a spyware type of incident given the name "MarketScore," which, as a side note, is an Internet research panel that offers reports on Internet trends and offers virus scan software. Any events already configured for the selected incident are listed in incident events fields 452. To configure a new event, fields 454 allow the security analysts to indicate the source of the event. The source can be any data source, application, module, etc. for monitoring security incidents. In the present example, the event source in fields 454 is selected as SiteProtector™ from Internet Security Systems, Inc.

In fields 454, the security analyst can also configure the event to add one or both of the hosts of interest (e.g., source host or target host) that were involved in the event, can add a name to the event, and can add a status color to the event to facilitate review. In this example, whenever a spyware event occurs within the SiteProtector™ system, the host that was the source of the event, rather than the target, is added to the incident. Once configured with this screen 400E, the security tool will automatically add information of the configured event to the incident whenever detected. Then, the security analysts can review a threat report for the incident by selecting the threat report link 446 for the incident on the incidents screen 400E of FIG. 4E.

In FIG. 4G, a detail screen 400G for an incident is shown. The security analyst accesses this screen 400G by selecting one of the incidents displayed in the incidents table 440 of screen 400E in FIG. 4E. In the present example, the selected incident is named W32.MYTOB—Virus.

The detail incident screen 400G shows a list 460 of the hosts 462 currently involved in the selected incident. The involved hosts 462 are ordered in the list 460 by the last activity column 468 so that the hosts 462 that are currently still active within the incident 461 are displayed at the top of the list 460. For each listed host 462, the list 460 shows a current "Status" 463, an "Action" 464 taken by analysts on the host, a "Contact" 465 for the host, comments 466 about the host, the last analyst 467 that modified the host within this incident's context, and the analyst 469 that added the host to the incident if the host was added manually and not through an automated mechanism, such as through the "Add Event to Incident" screen 400F of FIG. 4F.

A plurality of tools 461 are provided on screen 400G that allow security analysts to generate an incident report ("Incident Report (.CSV)), to add multiple hosts to the incident ("Add Multiple Hosts"), and to obtain the next host associated with the incident that has not been reviewed or updated by any analyst ("Get Next Host'). For example, the "Add Multiple Hosts" of the tools 461 allows an analyst to manually input information, such as a list of IP addresses, and associate them with the incident. The list of IP addresses may come from an external source of information and may show various IP addresses that have attacked or attempted to intrude the computer network, for example. After the IP addresses are input, the security tool of the present disclosure attempt to match the IP addresses with existing host information or adds new host information, and the security tool associates the determined hosts for the input IP addresses to the selected incident.

In another example, the "Get Next Host" of the tools 461 allows an analyst to retrieve information of a host from the table 460 that has been associated with the selected incident but that has not yet been reviewed or updated by any security analyst. Because the security tool can automatically associate events caused by hosts to an incident, the disclosed security tool also tracks whether a security analysts has updated information for the hosts associated with the incident. The "Get Next Host" of the tools 461 provides a host associated with the incident that has not been updated. After selecting the "Get Next Host" of the tools 461, for example, the analyst is presented with a detail host incident screen 400H shown in FIG. 4H for the next host in the table 460 that caused an event of the incident but has yet to be reviewed.

Figure 4H:
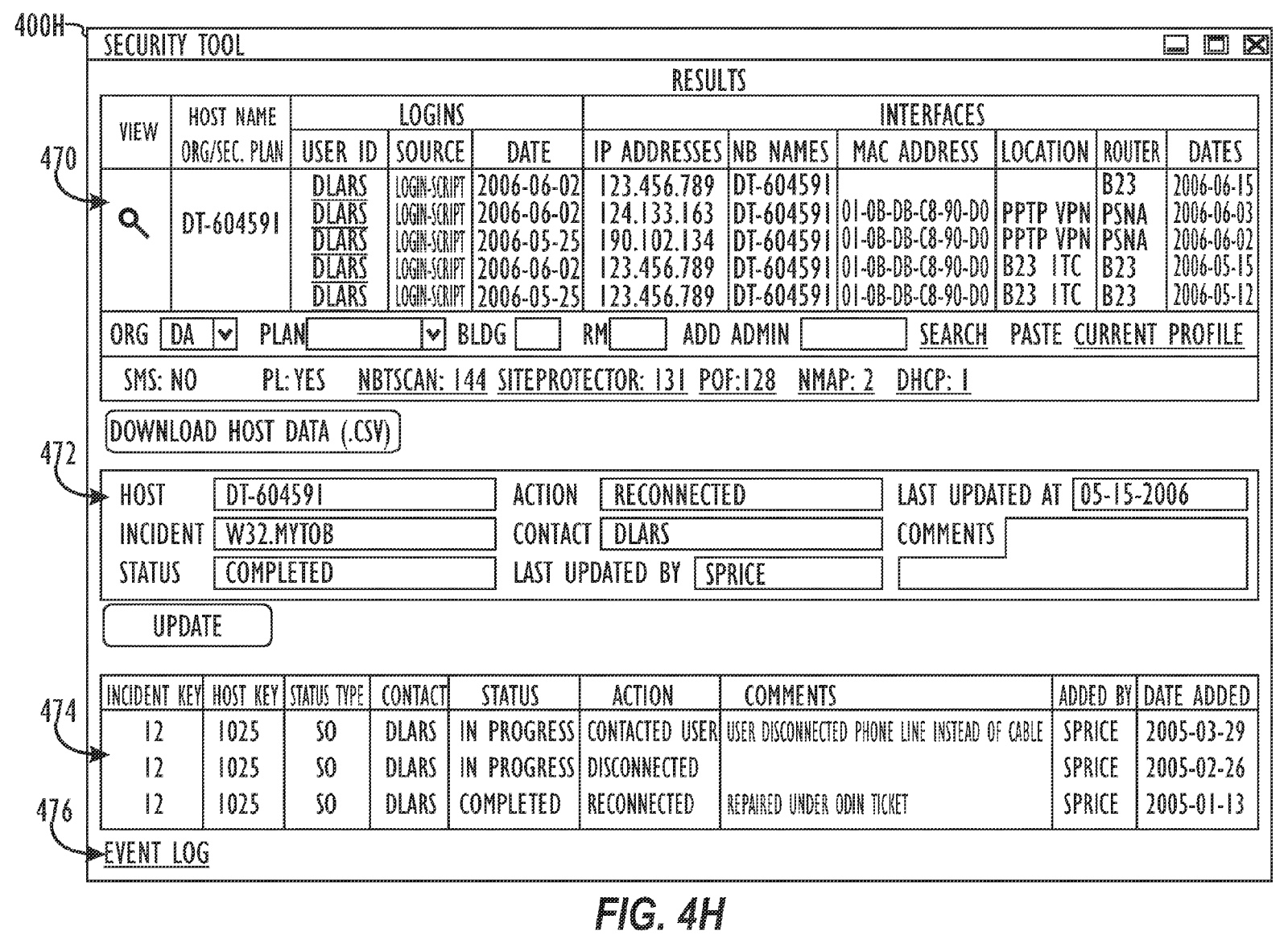

To access the detailed incident screen, the analysts can also select the magnifying glass icon for a listed host 462 in the table 460. In FIG. 4H, for example, a detail host incident screen 400H for a host related to an incident is shown. The screen 400H includes a host table 470 showing clustered host information that is similar to that discussed previously for the host search and includes the logins and interfaces of the selected host. The screen 400H includes an input section 472 for entering new data related to the host's current status within the selected incident. For example, the security analysts can modify the host name, incident name, status, action taken, contact, analyst to last update, the date of the last update and provide comments.

In addition to the host information 470 and input section 472, the screen 400H also includes a history table 474 of the activity for this host within the incident. The history table 474 lists a key for the incident, the HostKey for this host involved, the status type, the contact, the status, the action taken, comments, which analyst added the host, and the date it was added. The security analyst can also access event logs using a link 476 on this screen 400H. The detail host incident screen 400H lets the security analyst access and track a particular host's involvement in various incidents and events in the computer system.

Figure 4I:
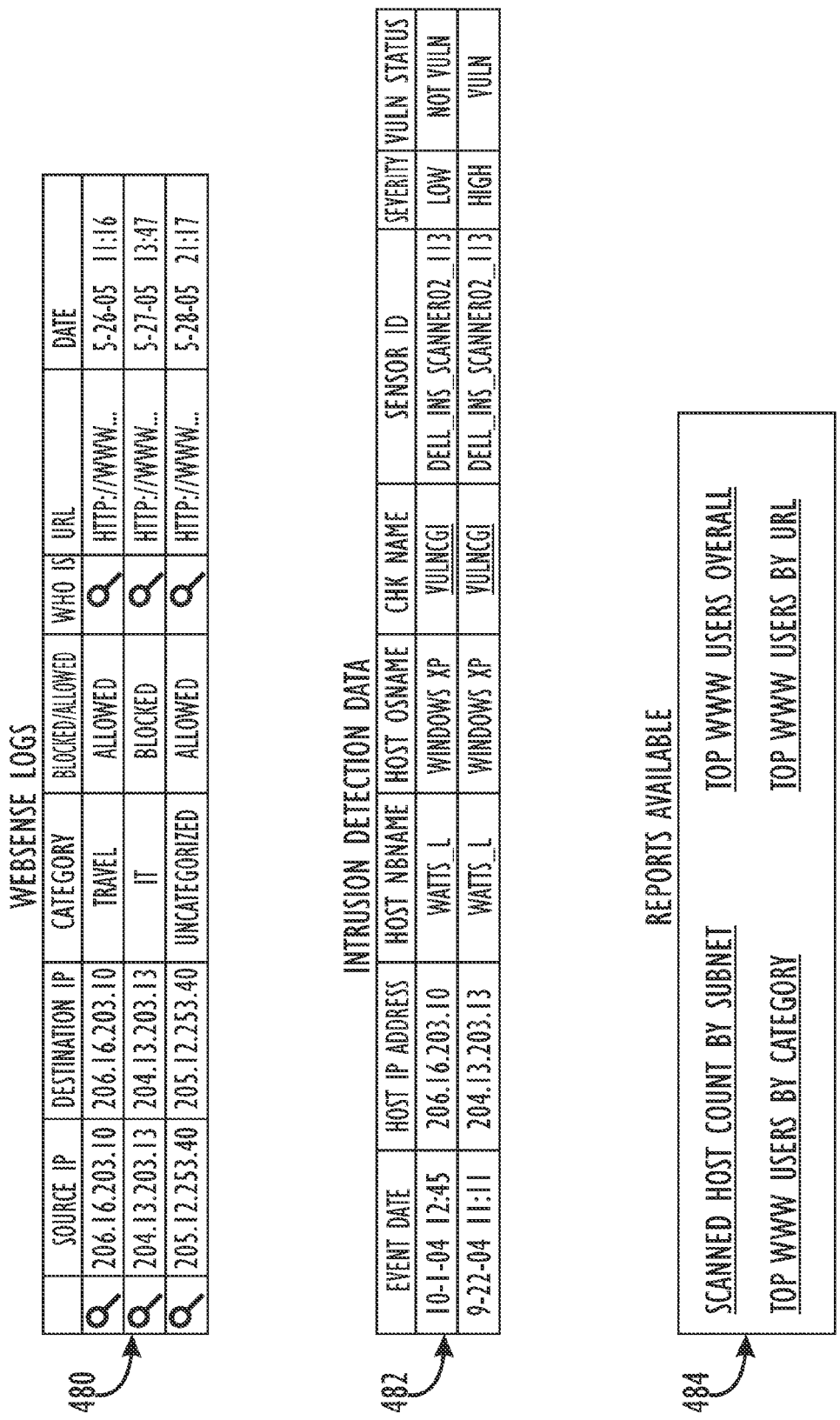

In FIG. 4I, some additional elements 480, 482, and 484 for screens of the GUI for the security tool 300 of FIG. 3 are shown. For simplicity, these elements 480, 482, and 484 are shown separate from any screen of the GUI. One element 480 is a table of a Websense log that a security analyst can access using the "Web Log Search" link, for example, in the tools 402 shown in FIG. 4A. The Websense log table 480 can be generated by conducting a search based on date ranges, one or more categories of web pages, and other criteria. The results of the search can be listed in the table 480 as shown in FIG. 4I. For example, the table 480 lists the source IP of the web access, the destination IP of the web access, the category of the website or webpage of the destination IP, and whether access was allowed or blocked. The table 480 also includes a link ("WHOIS") for finding out who has registered the domain name and for viewing additional registration and Web site data with Network Solutions' enhanced WHOTS database. Finally, the table 480 includes the URL accessed and the date of the access. The categories in the table 480 may be configurable by the security analysts who has access for entering websense categories and associating websites and pages to those categories. In general, the websense log table 480 can be used by security analysts to determine which host is the source of a virus or spyware, which host is responsible for accessing prohibited websites, and other security purposes.

Another element 482 in FIG. 4I is a table of Intrusion Detection System (IDS) data that a security analyst can access using the "IDS Events" link, for example, in the tools 402 shown in FIG. 4A. The IDS data table 482 can be generated by conducting a search based on date ranges and other criteria. The results of the search are listed in the table 482 as shown in FIG. 4I. For example, the table 482 lists the date of an IDS event, the host IP address involved in the IDS event, the NetBIOS name of the host involved, and the operating system name of the host involved. The table 482 also includes a link for accessing a vulnerability that was being checked (e.g., Check Name) for the given scan entry in the table 482. In the present example, "vulncgi", which reports known vulnerable CGI programs, is the vulnerability that was checked. Finally, the table 482 shows what sensor ID detected the event, the determined severity of the event, and the current vulnerability status of the host involved. In general, the IDS data table 482 allows security analysts to access the vulnerability of hosts to external network intrusions.

Yet another element 484 in FIG. 4I is a table of available reports that the security analyst can access using the "Reports" link, for example, in the tools 402 shown in FIG. 4A. The reports table 484 lists a first link to a "scanned host count by subnet" report, a second link to a "top WWW users by category" report, a third link to a "top WWW users overall" report, and a fourth link to a "top WWW users by URL" report.

By selecting the "scanned host count by subnet" report, the security analyst can review a count of all scanned hosts currently connected by subnet to the computer system. The "top WWW users by category" report lists those users that most frequently accesses websites or pages of a selected category (e.g., search engine, travel, education, etc.). The "top WWW users overall" report lists the top users accessing websites or pages. Finally, the "top WWW users by URL" report lists the top users accessing a particular website or webpage. Each of these reports can be limited to a certain number of uses (e.g., the top 40) and can be limited to a time period (e.g., within the last hour) or date range (e.g., today, yesterday or last week).

Making security data available to users with the GUI 312 of FIG. 3 using screens and other GUI elements, such as those discussed above, represents one aspect of the security tool 300 according to certain teachings of the present disclosure. Another aspect of the security tool 300 focuses on how the security data collected by the loaders 300 is actually correlated, organized, and assigned to hosts in the database 320 of the security tool 300. Accordingly, we now turn to a detailed discussion of how the security tool 300 of the present disclosure receives data from loaders 330, associates the received data with hosts of the network computer network 350, and stores the data in the database 320 of the tool 300.

Because the network computer network 350 can be dynamic (e.g., can have a number of users logging in, disparate systems and machines, changing names and domains, etc.), the security tool 300 preferably handles security related data in a way that meets the dynamic needs of the system 350. In addition, the security tool 300 preferably best approximates or associates the disparate logins, interfaces, incidents, events, and other such activities occurring in the computer network 350 with the actual hosts responsible for them. Accuracy is especially preferred when determining which host (e.g., machine, user, etc.) of the computer network 350 is responsible for a violation, a source of a virus, a system vulnerability, or the like.

Figure 5:
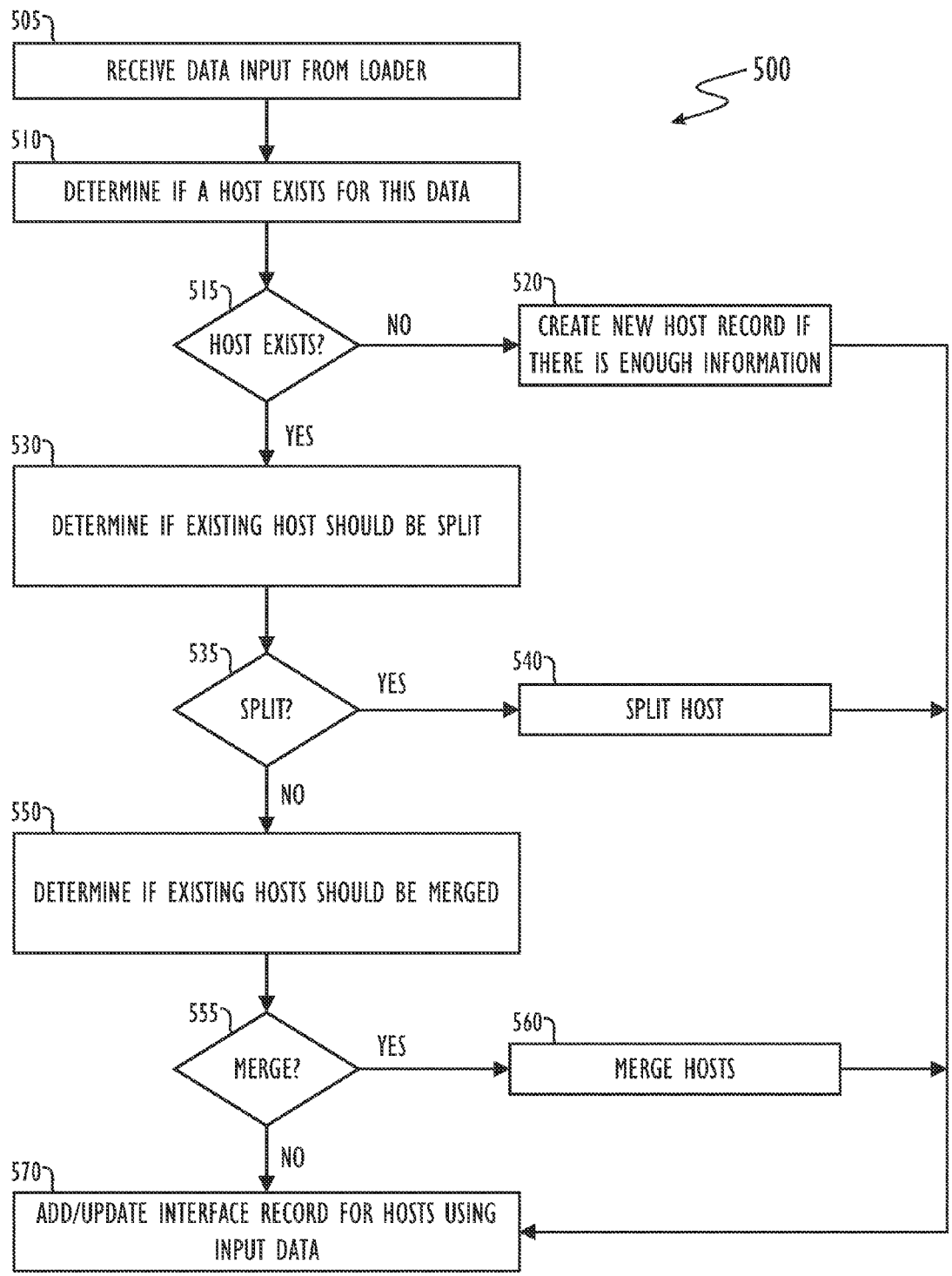
FIG. 5 illustrates an embodiment of an operating process for the security tool of FIG. 3.

Referring to FIG. 5, one embodiment of an operating process 500 of the security tool 300 of FIG. 3 is illustrated in flow chart form. For simplification in the discussion that follows, reference will be made to data loaded into the tool 300 for at least one host. It will be appreciated that the security tool 300 can load data related to a large number of hosts and process that data in bulk. To help describe the process 500, reference will also be made to element numerals of FIG. 3.

In operation, the core program 310 receives data from the loaders 330 that poll or subscribe to the various data sources 340 of the computer network 350 (Block 505). Once loaded, the core program 310 determines how to handle the loaded data. (One embodiment for determining how to handle the newly loaded data is discussed below with reference to a putHost function in FIGS. 6A-6C.)

First, the core program 310 determines if a corresponding host already exists for this newly loaded data by comparing the loaded data from the loaders 330 to host data already stored in the security database 320 (Block 510). (One embodiment for performing the comparison is discussed below with reference to a getHost function in FIGS. 7A-7B.) If a host is not determined to exist at Block 515, the core program 310 creates a new host record in the security database 320 if enough information has been received from the loader 330 (Block 520). Generally, creating a new host record at least requires that the loaded data include a trusted IP address. Then, the core program 310 can add or update an interface (I/F) record for the new host using the input data from the loader 330 received previously at Block 505 (Block 570).

If a host is found at Block 515, however, the core program 310 next determines if there is enough loaded data and if there are specific conflicts between the loaded data and the stored data to indicate that an existing host should be split into two hosts (Block 530). (One embodiment for performing this determination is discussed below with reference to a splitHost function in FIG. 8.) If a split operation is determined to be necessary at Block 535, the core program 310 proceeds with appropriately splitting or dividing the information into two hosts (Block 540). Then, the core program 310 can add or update an interface record for the split hosts using the input data from the loader 330 received previously at Block 505 (Block 570).

If a host split was not necessary at Block 535, however, the core program 310 next determines if there is enough loaded data and if there is a specific amount of similarity between the loaded data and the stored data to indicate that existing hosts should be merged together into one host instead of remaining separate hosts (Block 550). (One embodiment for performing this determination is discussed below with reference to a mergeHost function in FIG. 9.) If a merge operation is determined to be necessary or beneficial at Block 555, the core program 310 proceeds with appropriately merging or combining the information from two hosts into one host (Block 560). Then, the core program 310 can add or update an interface record for the merged host using the input data from the loader 330 received previously at Block 505 (Block 570).

If a host merge operation was not necessary at Block 555, however, the core program 310 can add or update an interface record for a host found during the acts of Block 515 using the input data from the loader 330 received previously at Block 505 (Block 570). During operation, therefore, the core program 310 can add new hosts, split information associated with one host into two hosts, or merge information from separate hosts together into one host. In addition, the core program 310 can add and update interface records for hosts based on the data loaded from the loaders 330. Once the process 500 is complete, users can use the GUI 314 of the security tool 300 to access, analyze, and report the security information as disclosed herein.

As alluded to above, a number of functions can be used in the core program 310 to determine how to handle the data from the loaders 330. It will be appreciated that data from the loaders 330 can be incomplete, misleading, inaccurate, etc. for any number of reasons within a dynamic networking environment. To help handle the loaded data, the core program 310 has the functions 312 that, in one embodiment, include putHost, getHost, splitHost, and mergeHost functions. Each of these illustrative functions 312 will be discussed below with reference to FIGS. 6A through 9. To help describe these functions, reference will be made to the element numerals of FIG. 3 in the discussion that follows.

Figure 6A:
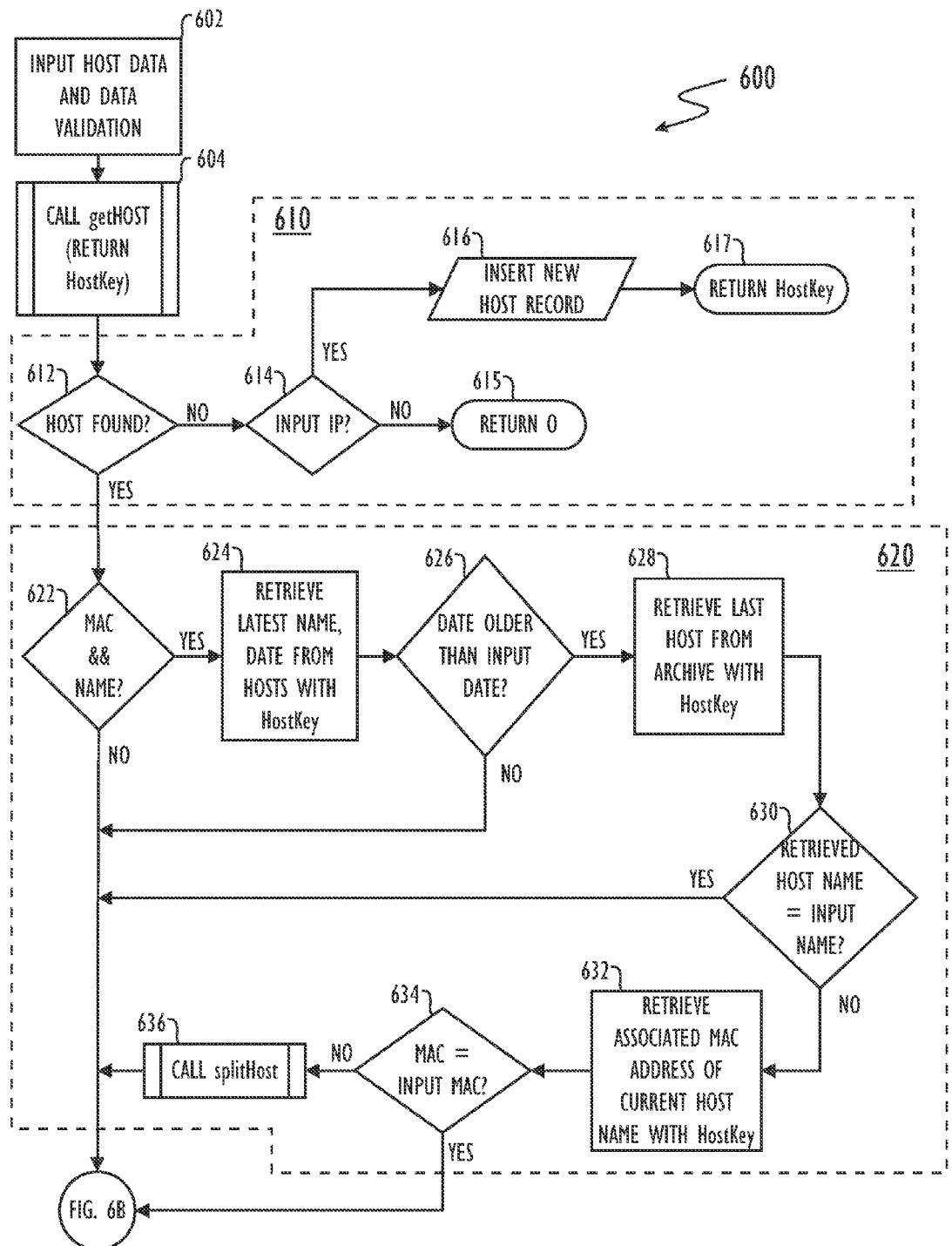
FIGS. 6A-6C illustrates one embodiment of a putHost function for the security tool of FIG. 3.
Figure 6B:
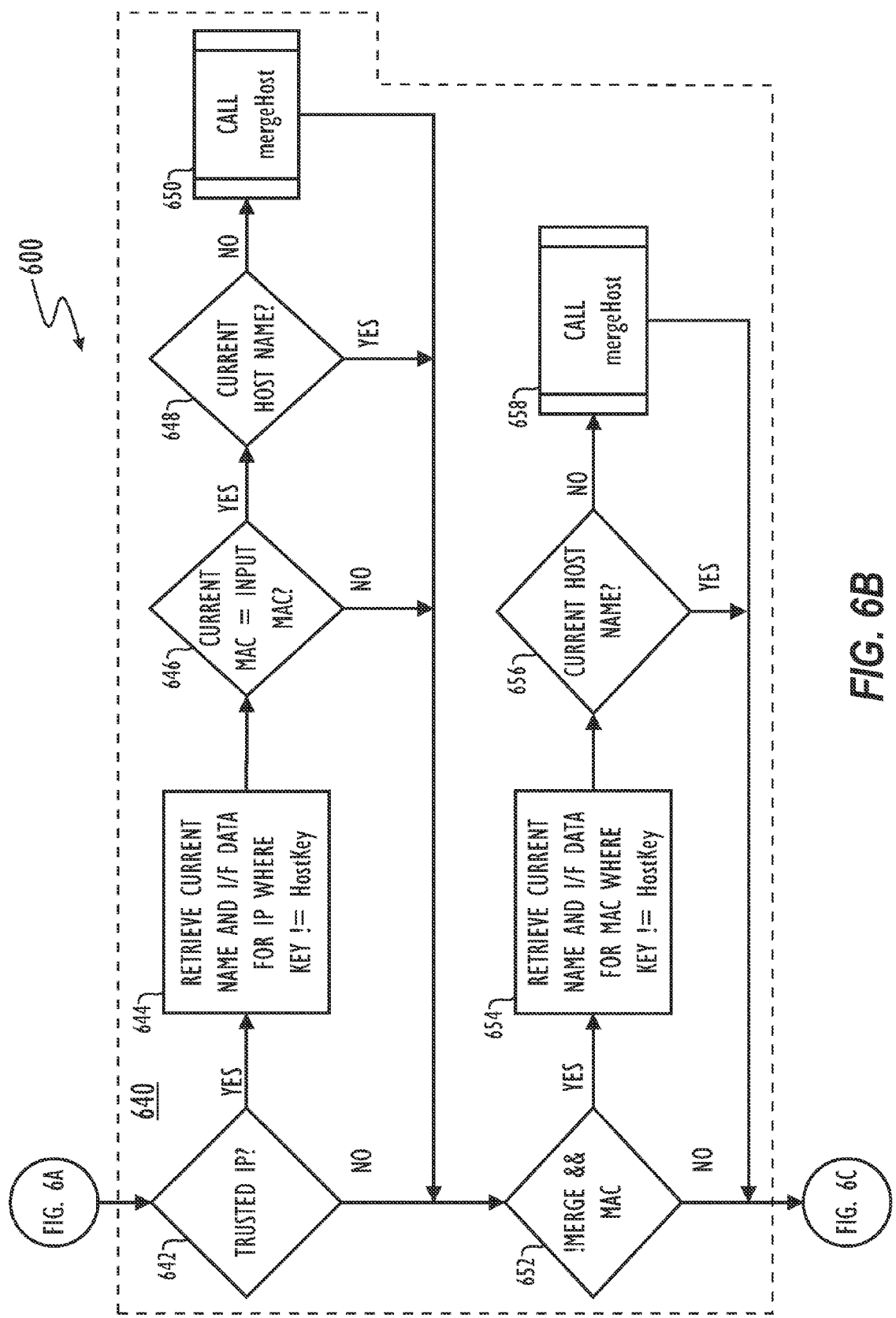
Figure 6C:
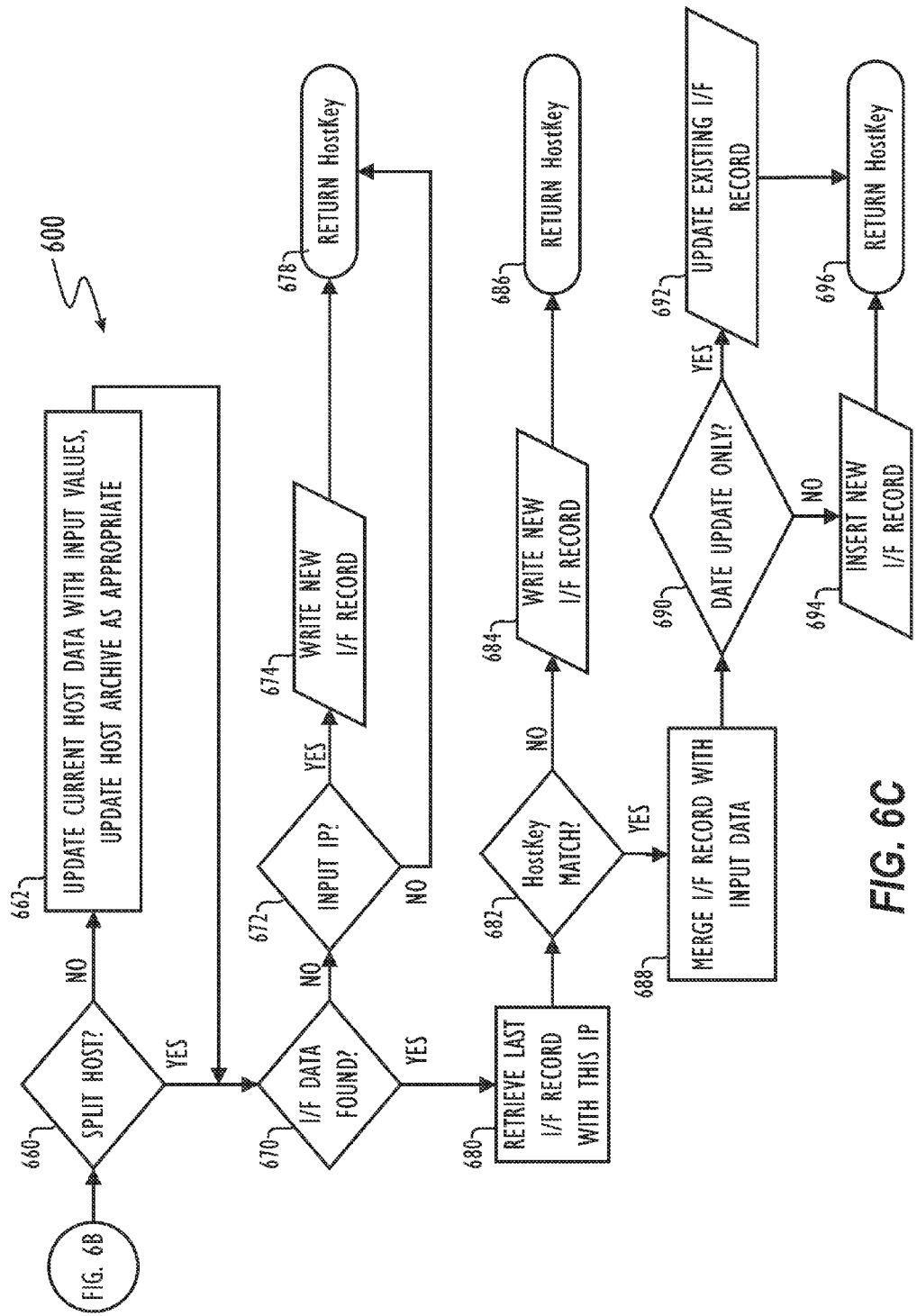

Referring to FIGS. 6A-6C, one embodiment of a putHost function 600 for the disclosed security tool 300 is illustrated in flow chart form. The putHost function 600 operates as a main function to determine how to put (e.g., assign, create, disregard, associate, etc.) newly loaded data from the loaders 330 into the existing context and arrangement of hosts and related data already known and stored in the security tool 300.

Beginning in FIG. 6A, the putHost function 600 is called by a loader 330 when loading information into the security tool 300. (In another embodiment, the putHost function may periodically poll a loader.) Initially, data from the loader 330 is input and validated (Block 602). The validation process may simply determine whether a MAC address has a valid format or the like so that clearly erroneous data is not accepted input for further processing.

Figure 7A:
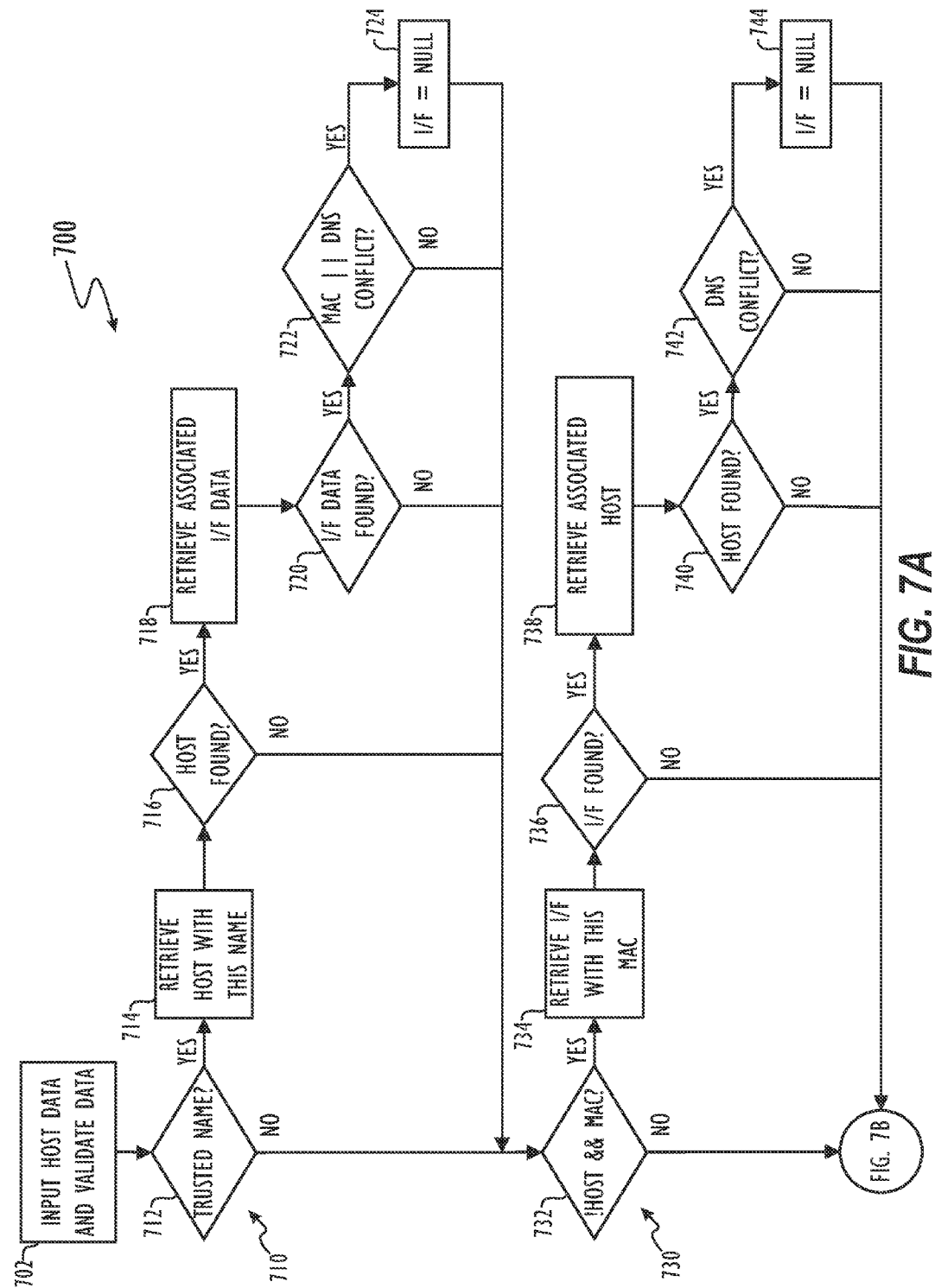
FIGS. 7A-7B illustrate one embodiment of a getHost function for the security tool of FIG. 3.
Figure 7B:
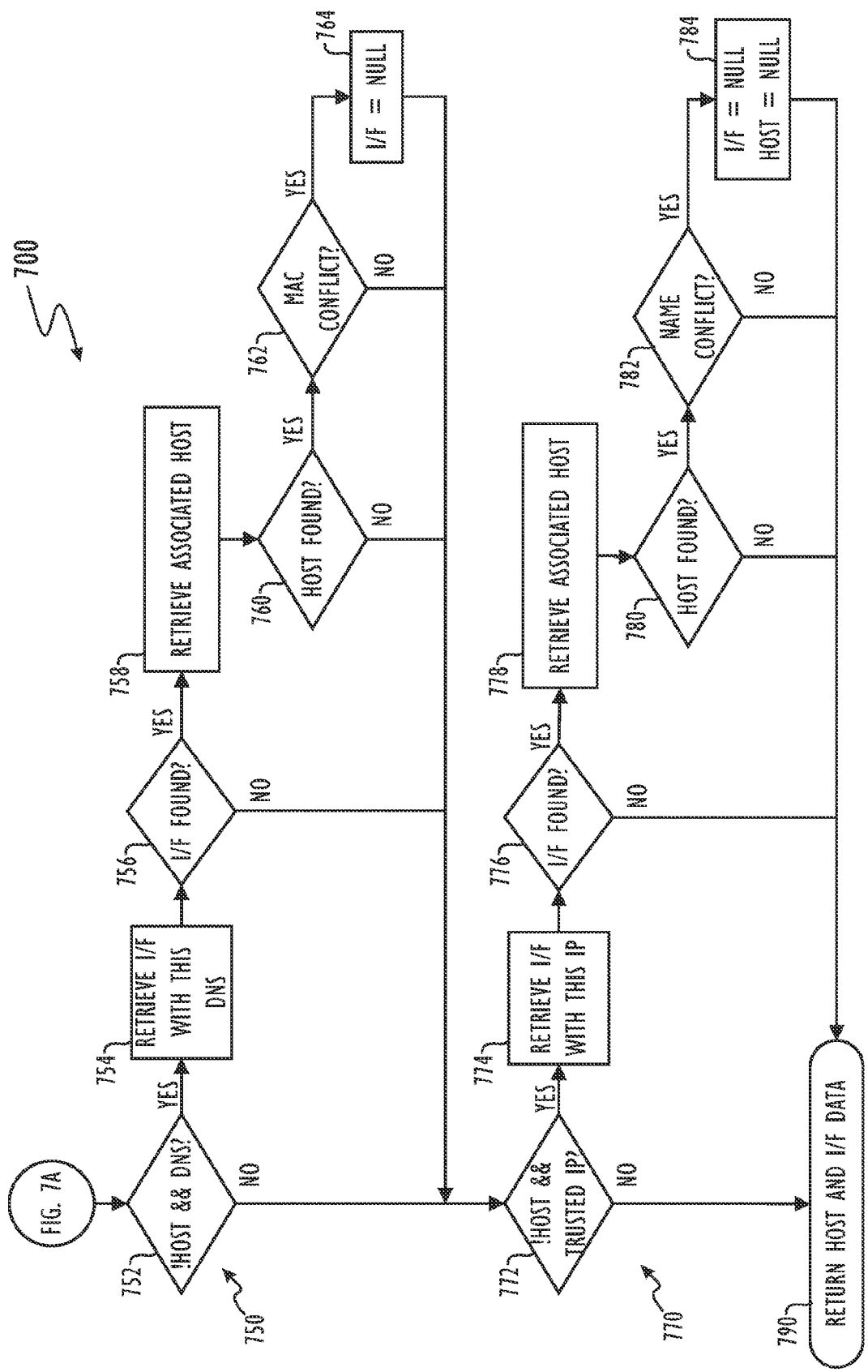

The function 600 then calls the getHost function (700; FIGS. 7A-7B) discussed below, which returns a HostKey for a host if such is found in the security database 320 based on the data provided to the getHost function (Block 604). As discussed in more detail below with reference to FIGS. 7A-7B, the getHost function 700 goes through a series of determinations to ascertain whether a host (described by data from the loader 330) has the same NetBIOS name, MAC address, DNS name, or trusted IP address as a previously stored host in the security database 320. If the data from the loader 330 pertains to a host found with the getHost function 700, then the getHost function 700 returns the HostKey for the found host along with other information, such as interface records and data for the found host. If the getHost function 700 was not able to find a host, then the HostKey returned is NULL or some similar value that indicates no match was found. However, even if a host is not found, the getHost function 700 may have found some interface data that matches at least some of the input data.

After returning from the getHost function 700, the putHost function 600 performs a first determination (Block 610) to determine if the input data belongs to a host that is entirely new to the security tool 300. First, the function 600 determines whether a host was found by the getHost function 700 (e.g., whether an existing HostKey was returned) (Block 612). If not, the input data from the loader 330 may pertain to an entirely new host of the computer network 350, and the function 600 determines if there is at least an IP address in the input data from the loader 330 (Block 614).

If there is not at least an input IP address, the function 600 returns "0" (or a functionally equivalent value) and terminates because there simply is not enough information to make a new host record based on the input data from the loader 330 (Block 615). If there is an input IP address in the loaded data, the function 600 inserts a new host record in the security database 320 (Block 616) and returns a HostKey for this new host (Block 617). Thus, when new information is input from one of the loaders 330 at a later time that matches the input data for this new host, the security tool 300 can retrieve the records associated with this entirely new host using the newly assigned HostKey.

If a host was found during the acts of Block 612 by the getHost function (700), the putHost function 600 makes a series of subsequent determinations (Blocks 620 and 660) to determine how to handle the loaded data in light of the host information already stored in the database 320. Due to differences in detection of host related data and due to changing, mixing, matching, and sharing of IP addresses, MAC address, DNS name, etc., there may be situations where one actual host of the computer network 350 has been assigned to separate hosts in the database 320 or where two actual hosts of the computer network 350 are combined as a single host in the database 320. Thus, the database 350 may have a level of inaccuracy in how it has previously mapped loaded data to hosts. The subsequent determinations (Blocks 620 and 640) of the putHost function 600 act to reduce the chances of incorrectly assigning the loaded data and correct any erroneously assigned data.

In the next determination (Block 620), then, the function 600 determines whether conditions exist for splitting hosts in the security database 320. Here, the function 600 determines whether the newly loaded data indicates that a new host should be split or separated from already stored information for a host in the database 320. First, the function 600 determines whether the input data at least includes a MAC address and a NetBIOS name (Block 622). If not, the function 600 proceeds to the next determination (Block 640) discussed below with reference to FIG. 6B because there is not a preferred amount of loaded data at this point to make the determination to split a host.

If the input data at least includes the MAC address and NetBIOS name, however, the function 600 retrieves the latest NetBIOS name and recorded date from those hosts stored in the database 320 that have the same HostKey previously obtained from the getHost function 700 (Block 624). Using the retrieved NetBIOS name and date, the function 600 determines whether the retrieved date is older than the input date of the newly loaded data (Block 626). It should be noted that the newly loaded data from the loader 330 may actually be older than some of the more recent information in the database 320 because the newly loaded data may come from a log or other data source 340 containing older information. If the retrieved date is not older than the input date, the function 600 returns for further determinations. If the retrieved date is older than the input date, there is a possibility that an erroneous determination or assumption occurred in loading host information in the database 320 in past operations. To find out if there is an even older record with the same NetBIOS name, the function 600 retrieves information associated with the last host from the host archive 326 of the security database 320 that has the current HostKey (Block 628) and determines whether the retrieved host name from that host archive 326 matches the input name (Block 630). If so, the function 600 proceeds to further determinations because it is unlikely that there was an erroneous determination of the host.

Figure 8:
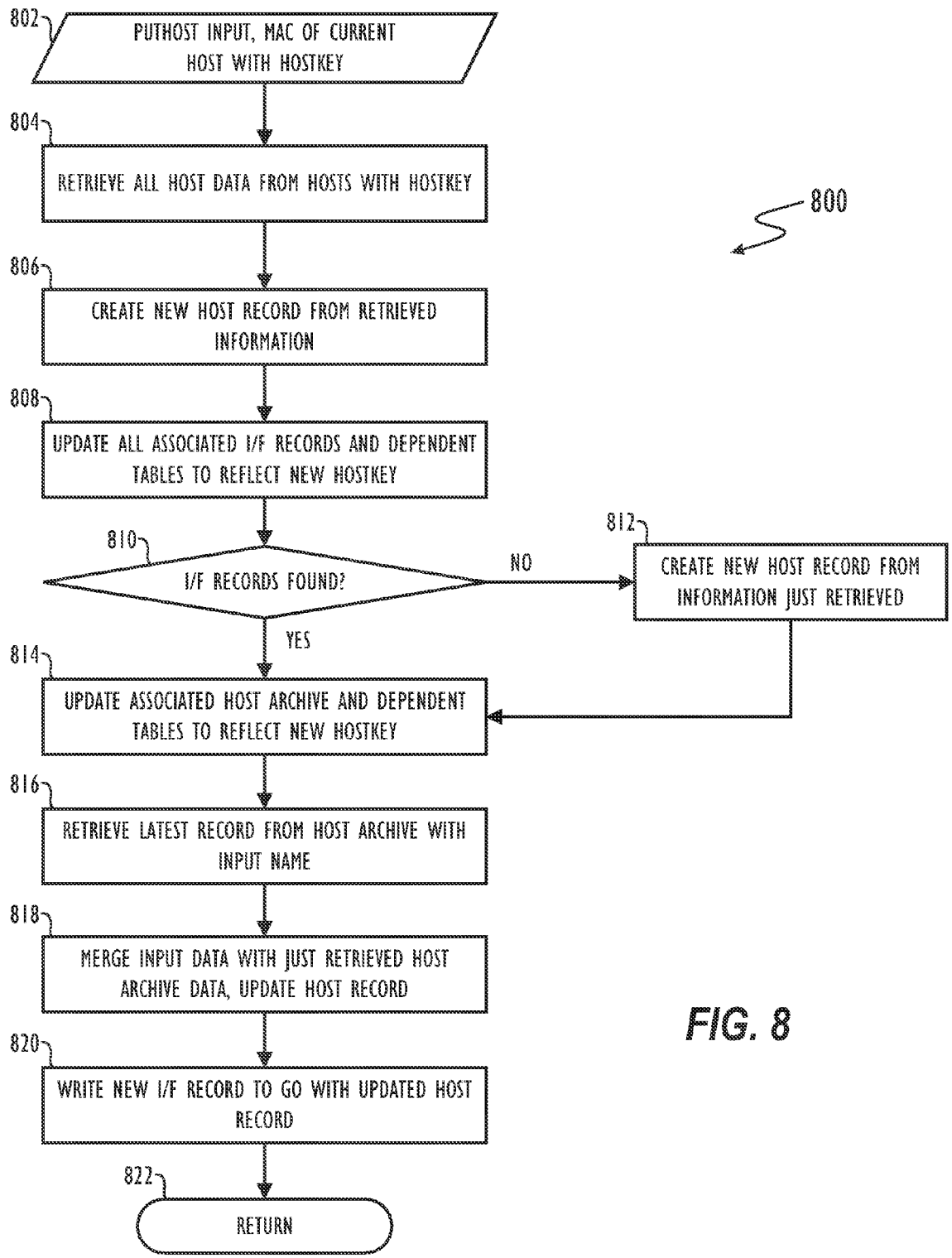
FIG. 8 illustrates one embodiment of a mergeHost function for the security tool of FIG. 3.

If the retrieved host name does not match the input name, the function 600 has essentially determined that the most recent host record with the same HostKey has a different name than the input name from the loader 330, but the function 600 has also determined that the most recent record in the host archive with the same HostKey has the same name as the input name. Thus, it is likely that previous host information has been erroneously assigned to the wrong host due to the difference in names but the same HostKey. The function 600 makes further comparisons by first retrieving the associated MAC address of the host record in the database 320 having the current HostKey (Block 632) and determines whether the retrieved MAC address matches the input MAC address of the loaded data from the loader 330 (Block 634). If they match, the function 600 proceeds to further determinations discussed below because it is unlikely that there has been an erroneous determination of the stored host information (i.e., the stored host information actually belongs to a different host from the "newly" loaded information) when the MAC addresses do not match. If there is not a match between the MAC addresses, then the function 600 calls the splitHost function (800; FIG. 8) because there is host information stored in the security database 320 that should be split into separate hosts. After the splitHost function (800) has been called and returns, the putHost function 600 proceeds to Block 660 in FIG. 6C.

In addition to the splitting determination discussed above (Block 620), the function can also perform a merging determination (Block 640), which is shown in FIG. 6B. In this phase of operation, the function 600 determines whether conditions exists that warrant merging host information in the database 320. First, the function 600 determines whether the IP address of the data from the loader 330 is trusted (Block 642). In a network environment (especially where VPN or the like is used), there may be a modem pool having IP addresses that are shared among various connecting machines. Such shared IP addresses are not trustworthy because they are routinely swapped among different machines. Trusted IP addresses, therefore, represent those that are more stable and more likely to belong consistently to the same machine.

If the IP address is not trusted, the function 600 proceeds to later determinations discussed below. If the IP address is trusted, however, the function 600 retrieves the current name and interface (I/F) data for the trusted IP address from those records in the database 320 where the key is not the same as the current HostKey previously returned by the getHost function 700 at Block 604 (Block 644). Those host records having the same trusted IP address but having different HostKeys may potentially belong with the current information being analyzed because they have the same trusted IP address albeit with different assigned HostKeys. The function 600 determines whether the current MAC addresses that have been retrieved for these host records matches the input MAC address of the data from the loader 330 (Block 646). If not, the function 600 proceeds to the later determination discussed below. Otherwise, the function 600 determines whether the loaded data has a current host name that matches the host name associated with the retrieved records.

Figure 9:
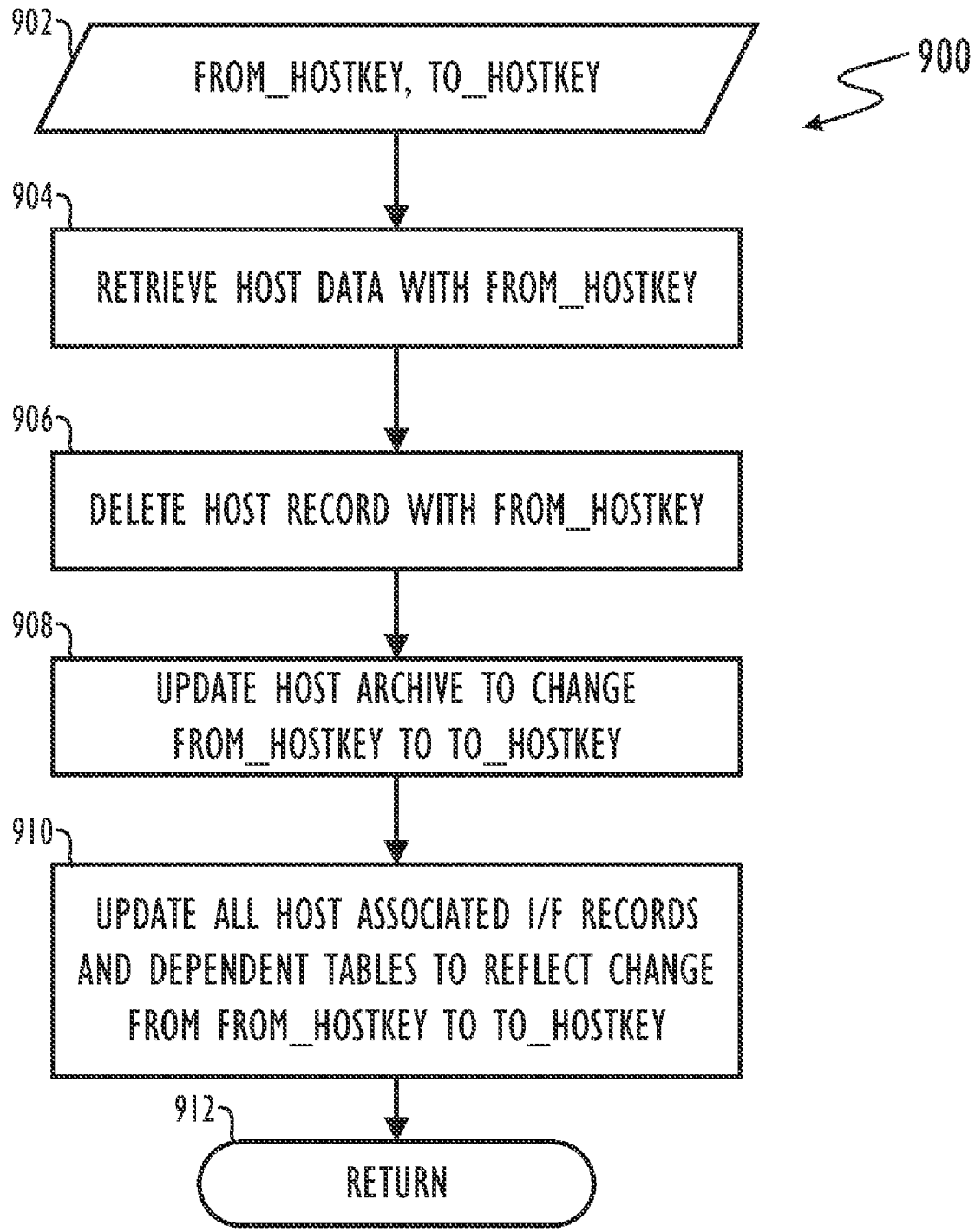
FIG. 9 illustrates one embodiment of a splitHost function for the security tool of FIG. 3.

If the names match, the function 600 proceeds to later determinations. It is not desirable to merge the current host information and the loaded data into one host if the host names match because it is possible that the information represents two hosts that have merely shared the same MAC address from the same network card. If the names do not match, however, the function 600 calls the mergeHost function (900; FIG. 9) because there are multiple hosts in the security database 320 that should be merged together as one host (Block 650). After returning from the mergeHost function 900, operation 600 proceeds to subsequent determinations.

In the next merge determination 640, the function 600 determines whether a merge operation has been previously made and whether the loaded data from the loader 330 at least includes a MAC address. If a merge operation has been performed and the MAC address is not known, then the function 600 proceeds to later determinations as discussed with respect to FIG. 6C. However, if a merge operation has not been performed and the MAC address is known, then the function 600 retrieves the current name and interface (I/F) data for those records having the same MAC address as the loaded data but having a HostKey that does not match the current HostKey returned by the getHost function 700 at Block 604. Those records having the same MAC address but different HostKeys could represent host records that need to be merged with the current information into one host record. After retrieving the information, the function 600 determines whether the data from the loader 330 has a current host name. If so, then the function 600 proceeds to later determinations because it will not be able to determine properly whether to merge the information. If there was no host name, however, the function 600 calls the mergeHost function (900; FIG. 9) to merge the information into a single host record and then returns for further determinations.

In FIG. 6C, we continue our discussion of subsequent determinations of the putHost function 600. Here, the function 600 determines whether a split host operation has been performed in previous determinations (Block 660). If split host has not been performed, the function 600 updates the current host data with the input values obtained from the loader 330, updates the host archive 326 as appropriate, and returns (Block 662). If a split host operation has been performed, these updates are not necessary and are not performed.

Subsequently, the function 600 determines whether interface (I/F) data has been found in the database 320 during any of the previous operations (Block 670). If not found, the function 600 determines whether the data obtained from the loader 330 at least includes an IP address. If the IP address is available, the function 600 writes a new interface record (Block 674) and returns the HostKey as it terminates (Block 678). If there is not an IP address, however, the function 600 simply returns the HostKey as it terminates (Block 678) without adding a new interface record because there is not enough information to confidently add a new interface record without an IP address.

If the interface data has been determined to be previously found at Block 670, the function 600 retrieves the most recent interface record in time having the input IP address of the loaded data (Block 680) and determine if the HostKeys match (Block 682). If not, the function 600 writes a new interface record for the loaded information (Block 684) and returns the HostKey as it terminates (Block 686). In this situation, it is possible that different hosts are using the same IP address.

If the HostKey's match, the function 600 merges the last interface record with the data obtained from the loader 330 (Block 688). Finally, the function 600 determines whether only a date update is required—i.e., the data obtained from the loader 320 is recent enough (i.e., on the same day) to the retrieved interface data that a date update is not needed (Block 690). If a date update is needed, the function 600 updates the existing interface record's date (Block 692). Otherwise, the function 600 inserts a new interface record with the current date (694). Finally, the function 600 returns the HostKey as it terminates (Block 696).

As noted previously, the security tool 300 attempts to get existing host information from the security database 320 that matches the loaded data when initially attempting to put new data from the loader 330 into the security database 320. Turning now to FIGS. 7A-7B, one embodiment of a getHost function 700 is illustrated in flow chart form. Initially, the loaded data from the putHost function (600; FIGS. 6A-6C) is input and validated (Block 702). Depending on the amount of information loaded from the loader 330, the input data can include a NetBIOS name, an IP address, a MAC address, a DNS name, a date, and an operating system. After validating, the function 700 steps through a series of determinations 710, 730, 750, and 770 to get information for a host that corresponds to the input data.

A first determination 710 checks to see if the input data includes a trusted NetBIOS name before looking for information in the security database 320. Accordingly, the function 700 determines whether the input name is trusted (i.e., if the NetBIOS name is not generic) (Block 712). If the input NetBIOS name is trusted, the function 700 retrieves information from the security database 320 for a host having the trusted input name (Block 714) and determines whether the host with the trusted name is found in the database 320 (Block 716). If the host is found, the function 700 retrieves the associated interface data for this host (Block 718) and determines whether the interface data is found (Block 720).

If the interface data of the host is found, the function 700 determines whether the loaded MAC address or DNS name conflict with the retrieved MAC address or DNS name of the host already stored in the database 320 (Block 722). If there is a conflict, interface data associated with the loaded data is set to NULL, meaning that no interface data has been found in the security database 320 for a host matching the loaded data (Block 724). If there is not a conflict at Block 722, the interface data retrieved from the security database 320 remains associated with the loaded data. If this is the case, the function 700 will pass by all later determinations 730, 750, and 770 and will return the host and interface data that it has found in the security database 320 to the putHost function (600; FIGS. 6A-6C) as it terminates at Block 790.

If the input name is not trusted at Block 712, if a host with the trusted input name is not found at Block 714, or if interface data is not found at Block 720, the function 700 proceeds to later determinations 730, 750, and 770 to check more of the loaded data against hosts in the security database 320 and to eventually get information on a host, if available.

In the next determination 730, the function 700 determines whether a host has not been found yet and whether the loaded data at least includes a MAC address (Block 732). If a host has not been previously found but a MAC address is available, the function 700 retrieves interface data from the security database 320 that has the same MAC address as the loaded data (Block 734) and determines whether interface data has been found in the security database 320 (Block 736). If found, the function 700 retrieves a host (e.g., HostKey) associated with the found interface data having the matching MAC address (Block 738) and determines whether a host is found (Block 740). If a host is found, the function 700 determines whether the input DNS name conflicts with the DNS name stored in the security database 320 for the found host (Block 742). If there is a conflict, interface data for the loaded data from the loader is set to NULL, meaning that no matching interface data has been found in the security database 320 (Block 744).

If there is no conflict between the stored DNS name and the input DNS name at Block 742, the interface data retrieved from the security database 320 remains associated with the loaded data for the found host. Because a host has been found at Block 740, the function 700 will bypass later determinations 750 and 770 and will return the host and interface data that it has found in the security database 320 to the putHost function (600; FIGS. 6A-6C) as it terminates at Block 790.

If the input data lacks a MAC address at Block 732, if interface data with the same MAC address is not found at Block 734, of if a host is not found at Block 740, the function 700 proceeds to later determinations 750 and 770 to check more of the input data against hosts in the database 320 and to eventually get information on a host, if available.

In the next determination 750 (FIG. 7B), the function 700 determines whether a host has not been found yet and whether the input information includes a DNS name (Block 752). If a host has not been found and the DNS name is available, the function 700 retrieves the interface information having the same DNS name as the input DNS name (Block 754) and determines whether the interface data is found in the security database 320 (Block 756). If the interface data is found, the function 700 retrieves a HostKey for a host associated with the found interface data (Block 758) and determines whether a host is found (Block 760). If the host is found, the function 700 determines whether the input MAC address conflicts with the MAC address stored in the database 320 for the found host (Block 762). If there is a conflict, interface data is set to NULL, meaning that no matching interface data has been found in the security database 320 for the input data (Block 764).

If there is no conflict between the stored MAC address and the input MAC address at Block 762, the interface data retrieved from the security database 320 remains associated with the loaded data for the found host. Because a host has been found at Block 740, the function 700 will bypass later determination 770 and will return the host and interface data that it has found in the security database 320 to the putHost function (600; FIGS. 6A-6C) when it terminates at Block 790.

If the input data lacks a DNS name at Block 752, if interface data with the same DNS name is not found at Block 754, or if a host is not found at Block 760, the function 700 proceeds to the last determination 770 to check more of the loaded data against hosts in the security database 320 and to eventually get information on a host, if available.

In the final determination 770, the function 700 determines whether a host has been found and whether the input data at least has an IP address that is trusted (Block 772). If this final determination fails 770, the getHost function 700 has failed to find a host but may or may not have found some interface data associated with the loaded data. In any event, the function 700 returns a HostKey (NULL in this case) and any retrieved interface data that it has found in the security database 320 to the putHost function (600; FIGS. 6A-6C) when it terminates at Block 790.

If the host has not yet been found but the input IP address is trusted, the function 700 retrieves any interface data in the database 320 that has the same IP address as the input IP address (Block 772) and determines whether interface data is found (Block 774). If found, the function 700 retrieves a HostKey for a host associated with the interface data (Block 778) and determines whether a host has been found (Block 780). If a host is found, the function 700 determines whether the NetBIOS name stored in the security database 320 for the found host conflicts with the input NetBIOS name, if any (Block 782). If there is a conflict, the interface data is set to NULL, and the HostKey for the host is set to NULL, meaning that matching interface data and no host record has been found in the security database 320 for the input data (Block 784).

If there no conflict between the stored NetBIOS names at Block 782, the interface data retrieved from the security database 320 remains associated with the loaded data and the found host. Because a host has been found at Block 740, the function 700 returns the host and interface data that it has found in the security database 320 to the putHost function (600; FIGS. 6A-6C) when it terminates at Block 790.

If the input data lacks a trusted IP at Block 772, if interface data with the same IP is not found at Block 774, or if a host is not found at Block 770, the function 700 returns any information that it has found in the security database 320 to the putHost function (600; FIGS. 6A-6C) when it terminates at Block 790.

As noted previously with respect to the putHost function (600; FIGS. 6A-6C), there are certain conditions that warrant splitting information of a host. As its name indicates, the splitHost function 800 of FIG. 8 splits information previously designated for one host that should in fact be designated for two or more hosts. Initially, input from the putHost function (600; FIGS. 6A-6C) and the MAC address of the current host with the HostKey are input into the splitHost function 800 (Block 802). The function 800 then retrieves all host data from hosts having the same HostKey (Block 804) and creates a new host record from the data just retrieved (Block 806).

The function 800 then updates all associated interface records and other dependent tables to reflect the new HostKey (Block 808). Some of the dependent tables may include a table containing user comments about hosts, a table containing information about incidents for hosts, a table containing information about operating systems used by hosts, and other tables containing additional information. To perform the updates, the function 800 first determines whether interface records are found (Block 810). If not found, the function 800 creates a new host record from the just retrieved data (Block 812). In either case, the function 800 updates associated records in the host archive table 326 to reflect the new Host-Key (Block 814). The function 800 retrieves the most recent record from host archive table 326 with the same input name from the loaded data (Block 816) and merges the loaded data with the host archive data just retrieved from the host archive table 326 and updates the host record (Block 818). Finally, the function 800 writes a new interface record to go with the updated host record (Block 820) and returns to the putHost function (600; FIGS. 6A-6C) as it terminates (Block 822).

As noted previously with respect to the putHost function (600; FIGS. 6A-6C), there are certain conditions that warrant merging information of hosts together. As its name indicates, the mergeHost function 900 in FIG. 9 is responsible for merging the information previously designated for separate hosts together as one host. Initially, a "from_HostKey" and a "to_HostKey" are input into the mergeHost function 900 from the putHost function 600 (Block 902). The from Host-Key indicates the HostKey associated with the host record from which data is to be taken for the merge, and the to_Host-Key indicates the HostKey associated with the host record to which data is to be input for the merge.

The function 900 then retrieves the host data having the corresponding from_HostKey in the security database 320 (Block 904). While storing the data temporarily, the function 900 deletes the records associated with the from_HostKey (Block 906) and updates the host archive table 326 to indicate the change of the from_HostKey to the to_HostKey (Block 908). Using the host data retrieved previously with the from_HostKey, the function 900 then updates all associated interface records in the interface table 324 to reflect the change from the from_HostKey to the to_HostKey (Block 910). Finally, the function 900 returns to the putHost function (600; FIGS. 6A-6C) as it terminates (Block 912).

Security tools and associated methods disclosed herein can be used to achieve a number of security related benefits. One benefit, for example, is that the disclosed security tool enables improved response to incidents by correlating IDS alerts to machines, users, locations, related logs, operating systems, patches, security plans, etc. and by tracking the resolution of incidents. As a consequence, the disclosed security tools can reduce response times to incidents. In another benefit, the disclosed security tools can offer better coordination of resources and improved metrics, reporting, and status of computer systems over the prior art.

Yet another benefit of the disclosed security tools is that it can reduce the vulnerability of monitored computer systems by correlating scan data to machines, locations, risk acceptance tables, histories, security plans, etc. As a consequence, the disclosed security tool can also be used to automate rescans of monitored computer systems and increase the accuracy and completeness of the resulting vulnerability reports and disconnect lists for the monitored computer system. These benefits, in turn, may provide yet another benefit: reduced manual analysis by security administrators and reduced errors.

The disclosed security tool may also be used for reporting computer system status and trend information by supporting the generation of ad-hoc reports and by handling system registrations, firewall registrations, OCSM portals, and security plans. The disclosed security tool may also be used to perform forensics investigations of a monitored computer system by associating virus alerts (or users) to computers, sessions, firewalls, and URL logs that support investigations. Further still, security tools in accordance with the invention can correlate various types of infections to their sources (e.g., URL or IP address). Some of the resulting benefits, then, include reduced manual analysis by security administrators and greater accuracy. As a consequence, the number of infections in a monitored computer system can be reduced because sources of infections can be quickly blacklisted.

As used herein and in the claims, a "host" can be virtually any entity coupled to or part of a computer network. For example, a host can be (e.g., laptop, desktop, server, storage device, router, firewall, etc). As used herein and in the claims, a "computer system" is not meant to be limited to a particular type of system, but instead can encompass any of the various types of computer systems known and used in the art, such as enterprise computer systems, distributed computer systems, non-distributed computer system, etc. As used herein and in the claims, a "computer network" can be composed of intranets, the Internet, Wide Area Networks (WANs), Local Area Networks (LANs), or any combination thereof, and the "computer network" can be wired, wireless, or a combination thereof. As used herein and in the claims, a "data source" can be logs, files, databases, scans, sniffers, external applications, information systems, and any other source of data that can be used for security purposes for a computer system and associated network. As used herein and in the claims, a "database," such as the disclosed security database, can be a relational database, a flat file, a partitioned database, a non-partitioned database, and any other type of storage structure for data known and used in the art.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer security monitoring method, comprising;
storing information at at least one computer system about a plurality of known Hosts, each of the known hosts being an entity of a computer network, the at least one computer system programmed for computer security monitoring and operatively communicating with the computer network;
receiving data at the at least one computer system from one or more sources;
associating and storing with the at least one computer system at least some of the data and at least some information about a first of the known hosts with at least two hosts if it is determined by the at least one computer system that, based on the data, the information associated with the first known host is more accurately associated with the at least two hosts; and
associating and storing with the at least one computer system at least some of the data and at least some information about at least two of the known hosts with a single host if it is determined by the at least one computer system that, based on the data, the information associated with the at least two known hosts is more accurately associated with the single host.

2. The method of claim 1, wherein the act of storing information about a plurality of known hosts comprises assigning each of the known hosts with a unique host key.

3. The method of claim 1, further comprising associating and storing at least some of the data with a new host if it is determined that the at least some of the data is not associated with information about one of the known hosts.

4. The method of claim 1, further comprising associating and storing at least some of the data with at least one of the known hosts if it is determined that the at least some of the data is associated with information about the at least one known host.

5. The method of claim 4, wherein the data includes at least one identifier, and wherein to determine that at least some of the data is associated with information about the at least one known host, the method comprises:
   retrieving information about the at least one known host, wherein the at least one known host has the same identifier as the data;
   determining whether a conflict exists between at least a portion of the data with the retrieved information; and
   associating the data with the at least one known host based on whether the conflict exists.

6. The method of claim 5, wherein
   the at least one identifier comprises a Network Basic Input/Output System name, and
   the act of determining whether a conflict exists comprises determining if a Media Access Control address or a Domain Name System name in the data conflicts with a Media Access Control address or a Domain Name System name in the retrieved information.

7. The method of claim 5, wherein
   the at least one identifier comprises a Media Access Control address, and
   the act of determining whether a conflict exists comprises determining if a Domain Name System name in the data conflicts with a Domain Name System name in the retrieved information.

8. The method of claim 5, wherein
   the at least one identifier comprises a Domain Name System name, and
   the act of determining whether a conflict exists comprises determining if a Media Access Control address in the data conflicts with a Media Access Control address in the retrieved information.

9. The method of claim 5, wherein
   the at least one identifier comprises an Internet Protocol address, and
   the act of determining whether a conflict exists comprises determining if a Network Basic Input/Output System name in the data conflicts with a Network Basic Input/Output System name in the retrieved information.

10. The method of claim 1, wherein the data comprises a first identifier and a second identifier, and wherein to determine that, based on the data, the information associated with the first known host is more accurately associated with the at least two hosts, the method comprises:
    retrieving first information about the first known host, wherein the first information includes a first date that is older than a date of the data;
    retrieving second information about the first known host, wherein the second information has a second date older than the first date; and
    associating the first information to a new host and associating the data and the second information to the first known host if the first information has a different first identifier than in the data and if the second information has a same first identifier as the data.

11. The method of claim 10, wherein the first identifier comprises a Network Basic Input/Output System name, and wherein the second identifier comprises a Media Access Control address.

12. The method of claim 1, wherein the data comprises first, second, and third identifiers, and wherein to determine that, based on the data, the information associated with the at least two known hosts is more accurately associated with the single host, the method comprises:
    associating the data with first information about a first known host based on a comparison of the data with the first information;
    retrieving second information about at least one second known host not associated with the first known host but having the same first identifier as the data; and
    associating the data, the first information, and the second information with the single host if the second information has the same second and third identifiers as the data.

13. The method of claim 12, wherein the first identifier comprises an Internet Protocol address, wherein the second identifier comprises a Network Basic Input/Output System name, and wherein the third identifier comprises a Media Access Control address.

14. The method of claim 1, wherein the data comprises first and second identifiers, and wherein to determine that, based on the data, the information associated with the at least two known hosts is more accurately associated with the single host, the method comprises:
    associating the data with first information about a first known host based on a comparison of the data with the first information;
    retrieving second information about at least one second known host not associated with the first known host but having the same first identifier as the data; and
    associating the data, the first information, and the second information with the single host if the second information has the same second identifier as the data.

15. The method of claim 14, wherein the first identifier comprises a Media Access Control address, and wherein the second identifier comprises a Network Basic Input/Output System name.

16. The method of claim 1, further comprising receiving a definition of an incident concerning the computer network, and automatically associating information about one or more of the known hosts with the incident based on the definition.

17. The method of claim 16, further comprising tracking whether a user update has been made to the one or more known hosts associated with the incident;
    and providing the one or more known hosts associated with the incident that have not been updated to a user for updating.

18. The method of claim 1, further comprising receiving at least one search criterion, and returning a search result for one of the known hosts based on the at least one search criterion, the search result having a clustered set of interfaces between the one known host and the computer network.

19. A non-transitory programmable storage device having program instructions stored thereon for causing at least one programmable control device to perform a computer security monitoring method, comprising;
    storing information about a plurality of known hosts, each of the known hosts being an entity of a computer network;
    receiving data from one or more sources;

associating and storing at least some of the data and at least some information about a first of the known hosts with at least two hosts if it is determined by the at least one programmable control device that, based on the data, the information associated with the first known host is more accurately associated with the at least two hosts; and associating and storing at least some of the data and at least some information about at least two of the known hosts with a single host if it is determined by the at least one programmable control device that, based on the data, the information associated with the at least two known hosts is more accurately associated with the single host.

20. A computer system programmed with a computer security monitoring tool, comprising:

at least one database storing information on a plurality of known hosts, each known host being an entity of a computer network;

an interface module receiving data from one or more sources; and at least one program module associating the data with hosts and storing the data in the at least one database, the at least one program module configured to split the information currently associated with one of the known hosts into at least two hosts if it is determined by the at least one program module that, based on the data, the information currently associated with the one known host is more accurately associated with the at least two hosts; and merge the information currently associated with at least two known hosts into a single host if it is determined by the at least one program module that, based on the data, the information currently associated with the at least two hosts is more accurately associated with the single host.

21. The computer system of claim 20, further comprising a loader assigned to one of the sources, the loader obtaining data from the source and making the obtained data available to the interface module.

22. The computer system of claim 21, wherein the loader is selected from the group consisting of a script, a sniffer, an external application, and a passive operating system fingerprinting mechanism.

23. The computer system of claim 21, wherein the source is selected from the group consisting of a log file, a text log, a system log, a syslog stream, a Domain Controller log, an Active Directory log, a Firewall log, a database, an intrusion detection system database, a configuration management database, a Web Registration Database, a patch management database, a network scan, an Nmap scan, an NBTscan, an Internet security system vulnerability scan, an external application, a security system, an incident detection system, and a passive operating system fingerprinting mechanism.

24. The computer system of claim 20, further comprising a graphical user interface module operatively coupled to the at least one database and the at least one program module and accessible by a user via a browser.

25. The computer system of claim 24, where in the graphical user interface module is configured to receive a definition of an incident concerning the computer network from the user, and wherein the at least one program module is configured to automatically associate information about one or more of the known hosts with the incident based on the definition.

26. The computer system of claim 25, wherein the at least one program module is configured to track whether an update has been made by a user to the one or more known hosts associated with the incident, and wherein the graphical user interface is configured to provide the one or more known hosts associated with the incident that have not been updated to a user for updating.

27. The computer system of claim 24, wherein the graphical user interface module is configured to receive at least one search criterion and to return a search result for one of the known hosts based on the at least one search criterion, the search result having a clustered set of interfaces between the one known host and the computer network.

28. The computer system of claim 20, wherein the at least one database comprises a plurality of host records storing host information, the host records comprising one or more of a unique key to identify the host, a NetBIOS name, a NetBIOS domain, a date the host was last seen on the computer network, a date the host record was last updated, a date host related information was last collected, a location of the host, an operating system of the host, a serial number of the host, and an asset tag of the host.

29. The computer system of claim 20, wherein the at least one database comprises a plurality of interface records storing interface information related to the hosts interfacing with the computer network, the interface records comprising one or more of a time value for when the host connected with the computer network, an Internet Protocol address, a MAC address, a Domain Name System name, a NetBIOS name, a NetBIOS domain, a switch, a switch port, a jack number, a Network Interface Card, and a unique key to identify the host.

30. The computer system of claim 20, wherein to associate the data with hosts, the at least one program module is configured to associate the data from the interface module with a new host if it is determined that the data from the interface module is not associated with the information about one of the known hosts already stored in the at least one database.

31. The computer system of claim 20, wherein to associate the data with hosts, the at least one program module is configured to associate the data from the interface module with one of the known hosts already stored in the at least one database if it is determined that the data is associated with the information about the one known host.

32. The computer system of claim 20, wherein to split the information currently associated with one of the known host into at least two hosts, the at least one program module is configured to:

retrieve first information about a first known host stored in the at least one database, wherein the first information includes a first date that is older than a date of the data from the interface module;

retrieve second information about the first known host, wherein the second information has a second date older than the first date; and associate the first information to a new host and associate the second information along with the data to the first known host if:

(a) the first information has a different Network Basic Input/Output System name than the data, and (b) the second information has a same Media Access Control address as the data.

33. The computer system of claim 20, wherein to merge the information currently associated with at least two known hosts into a single host, the at least one program module is configured to:

associate the data with first information about a first known host based on a comparison of the data with the first information; retrieve second information about at least one second known host not associated with the first known host but having a same Internet Protocol address as the data; and associate the data, the first information, and the second information with the single host if:
(a) the second information has a same Network Basic Input/Output System name as the data, and
(b) the second information has a same Media Access Control address as the data.

34. The computer system of claim 20, wherein to merge the information currently associated with at least two hosts into a single host, the at least one program module is configured to:
associate the data with first information about a first known host based on a comparison of the data with the first information;
retrieve second information about at least one second known host not associated with the first known host but having a same Media Access Control address as the data; and
associate the data, the first information, and the second information with the single host if the second information has a same Network Basic Input/Output System name as the data.

* * * * *